Oct. 20, 1970     R. A. FRASCA ET AL     3,534,486
AVIATION TRAINER
Filed March 20, 1968     8 Sheets-Sheet 1
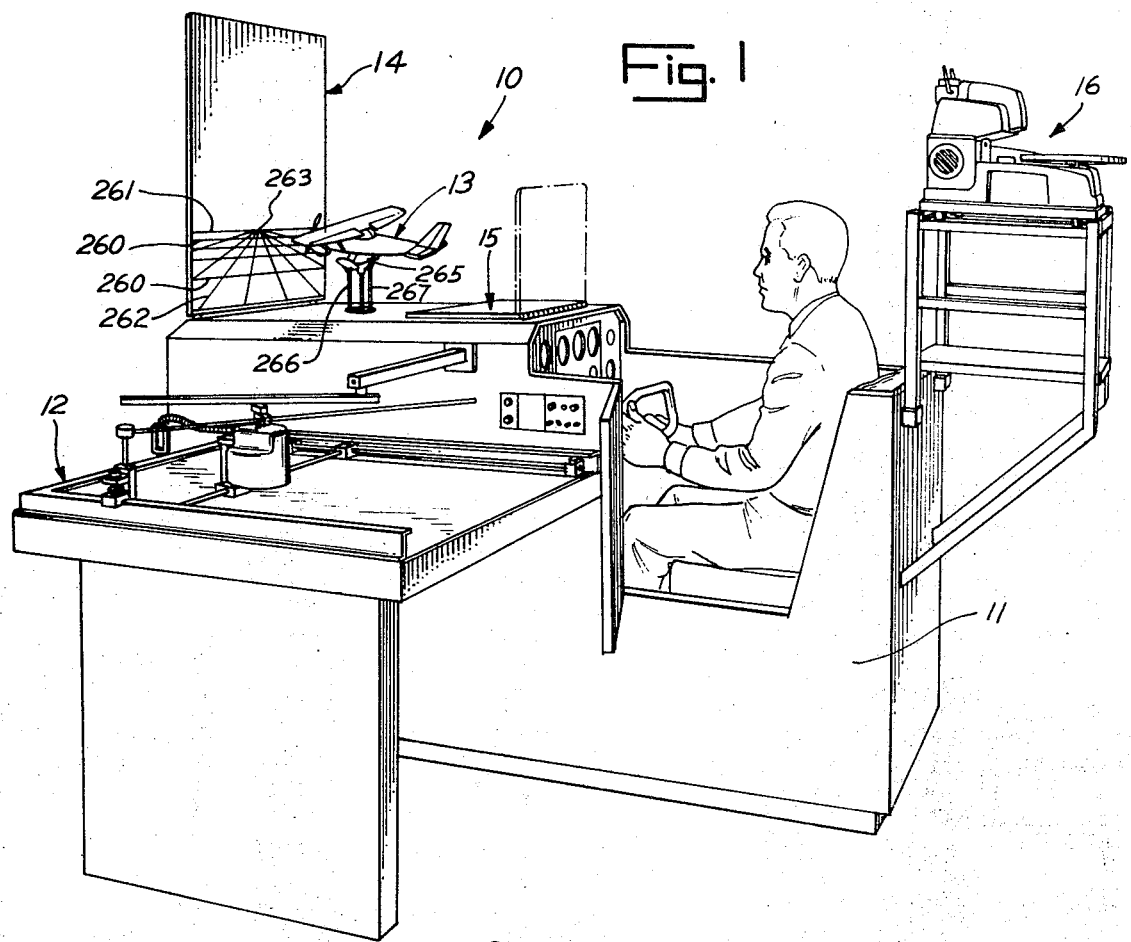
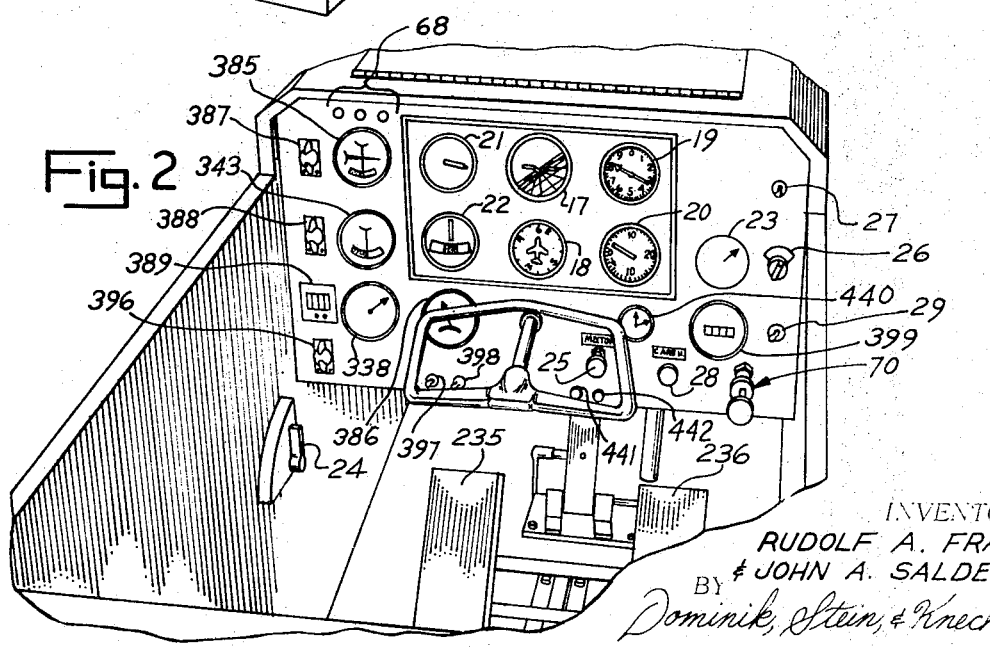
INVENTORS
RUDOLF A. FRASCA
& JOHN A. SALDEEN
BY
Dominik, Stein, & Knechtel
ATTORNEYS

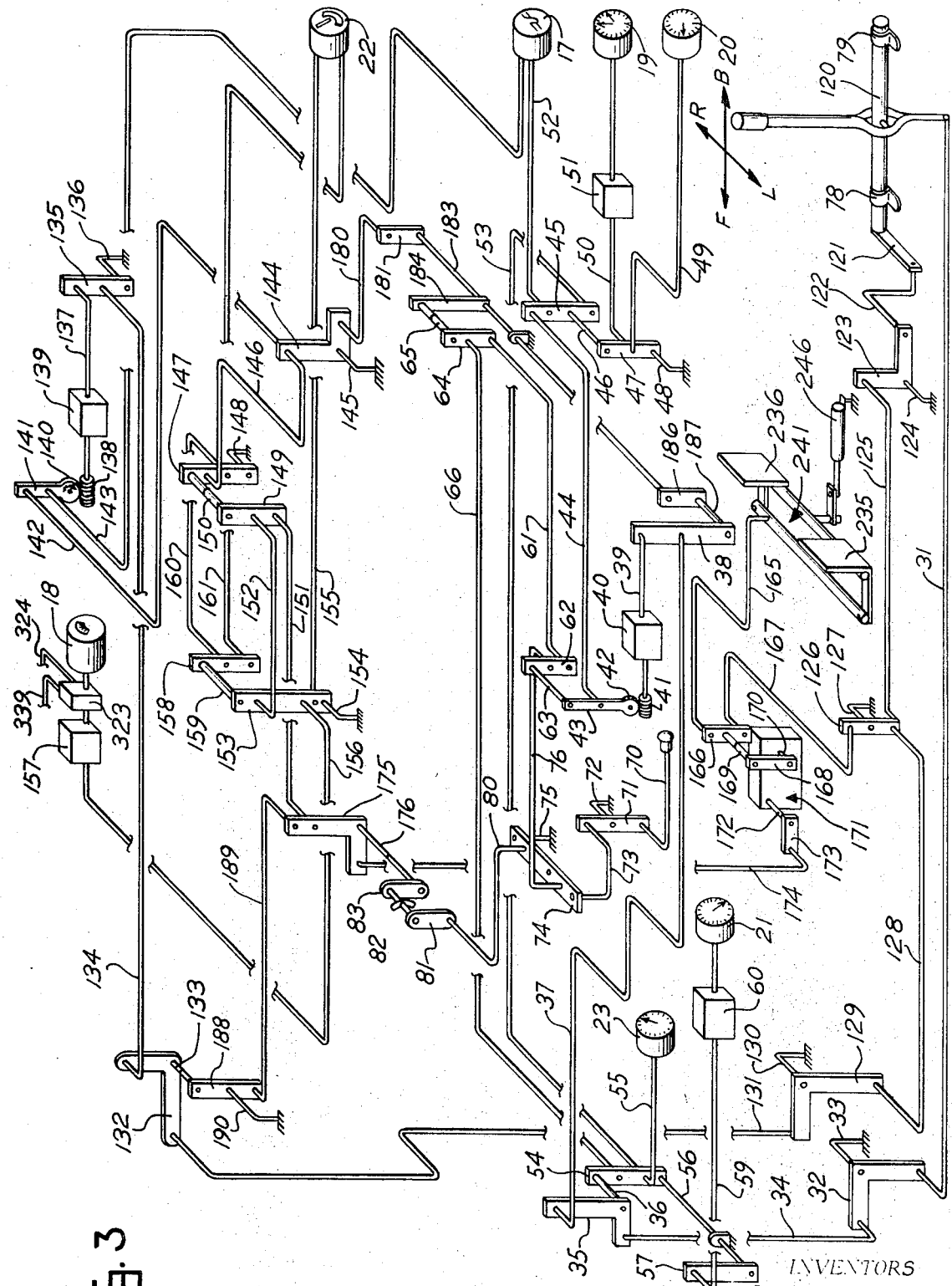

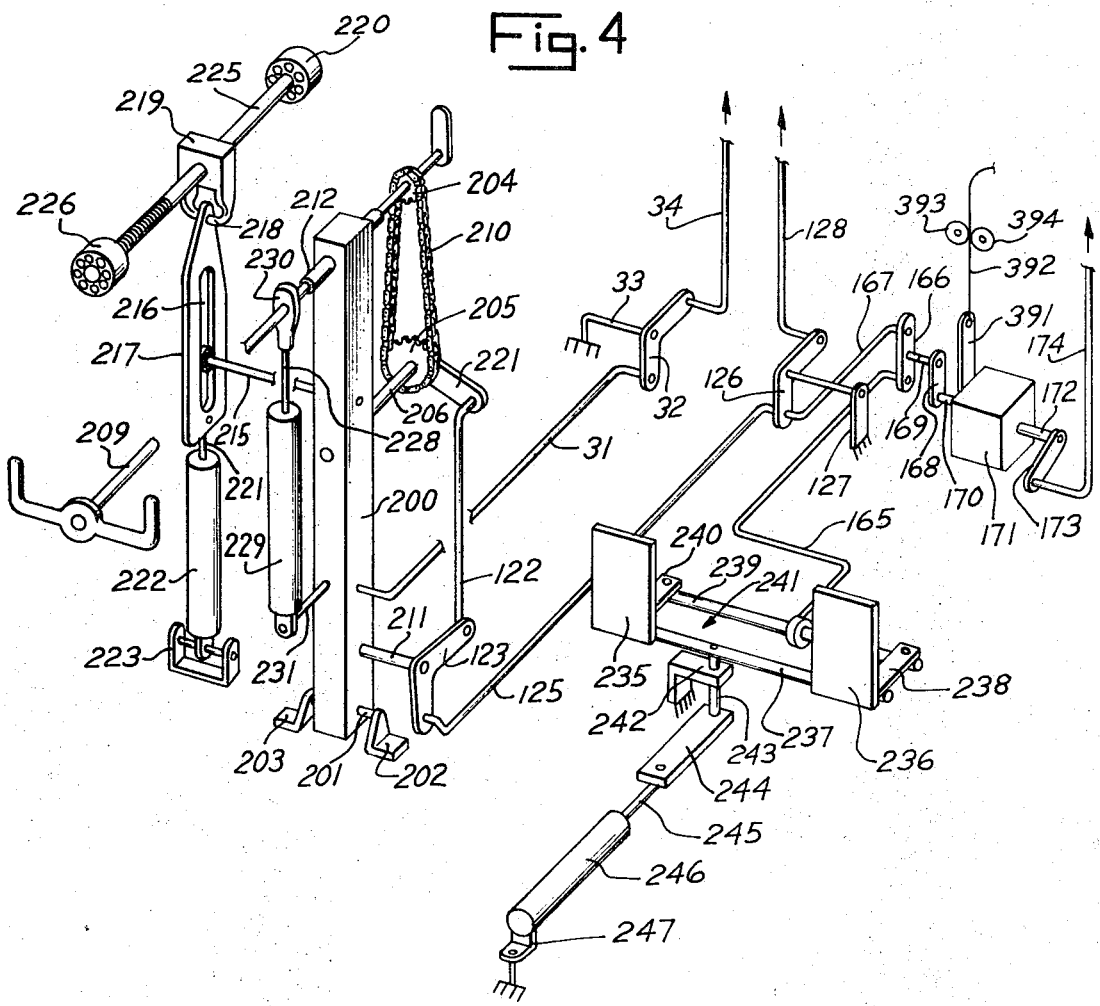

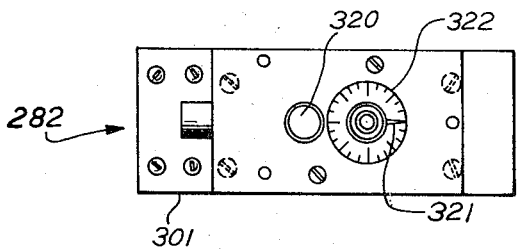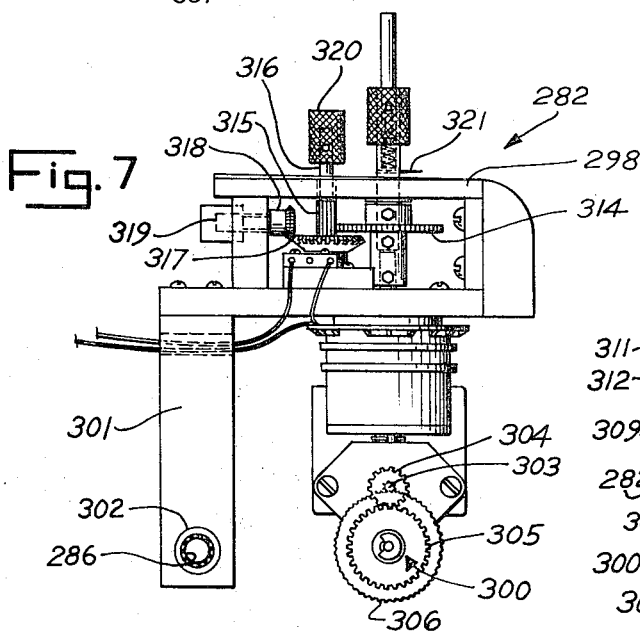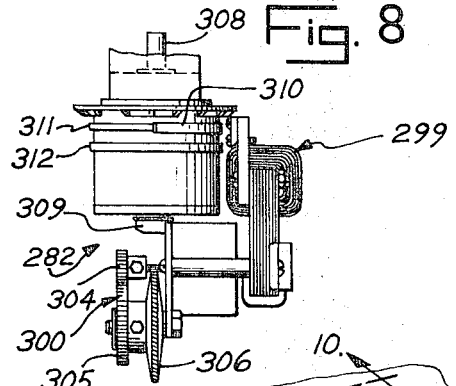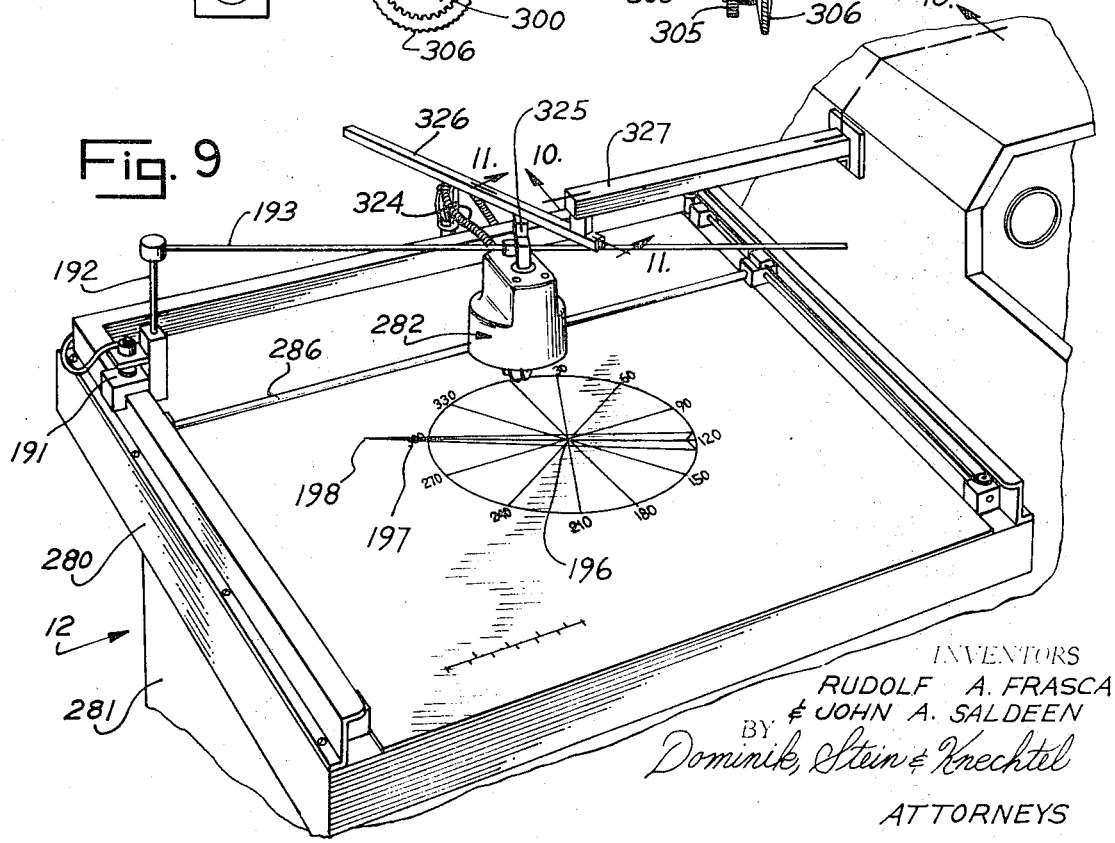

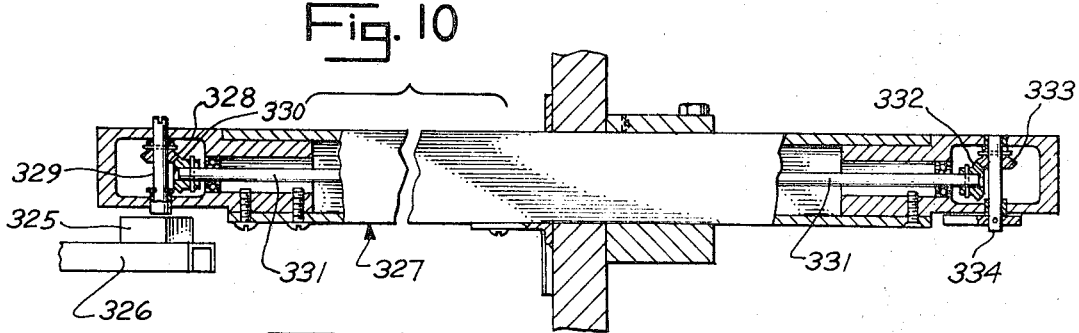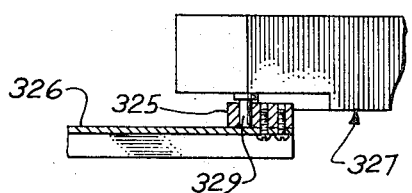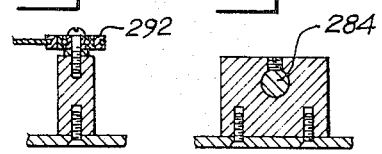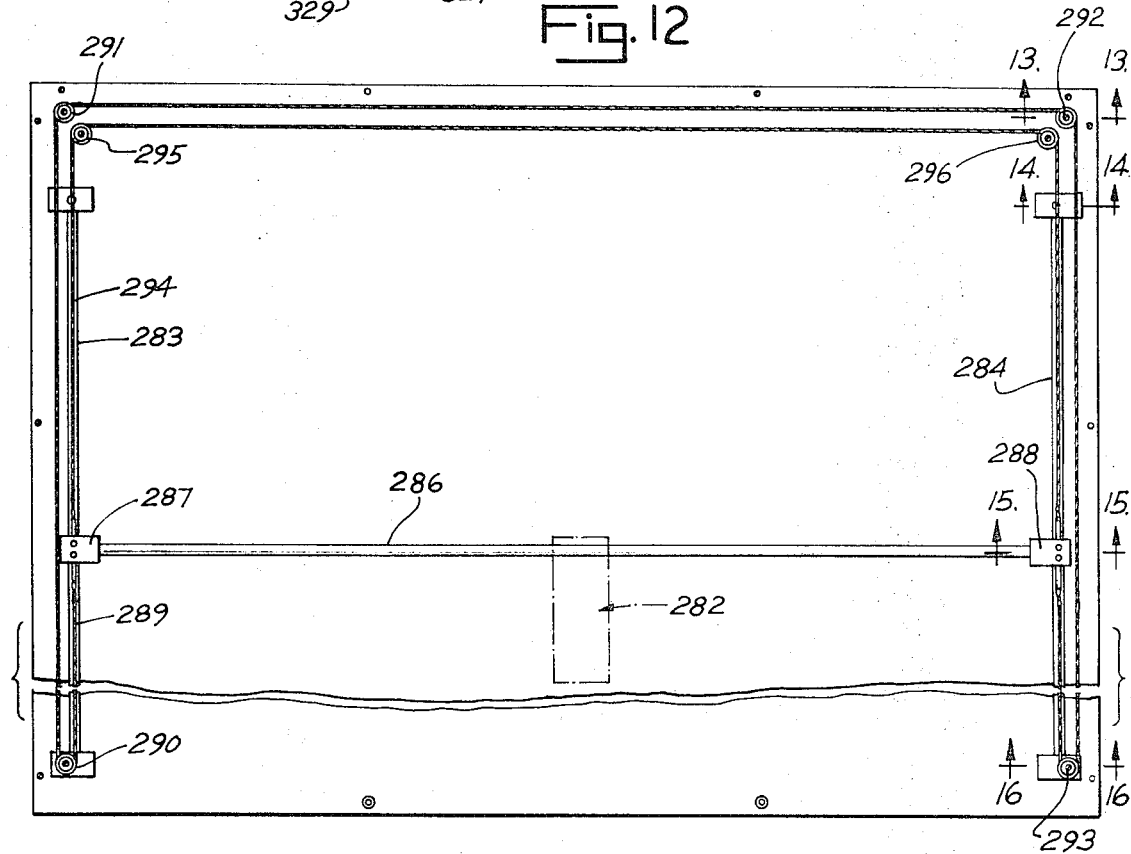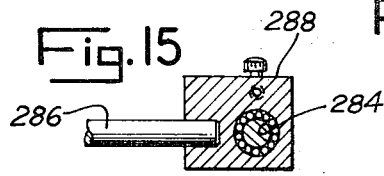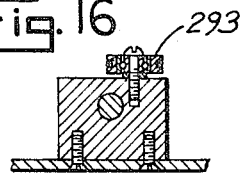

Oct. 20, 1970   R. A. FRASCA ET AL   3,534,486
AVIATION TRAINER
Filed March 20, 1968   8 Sheets-Sheet 7
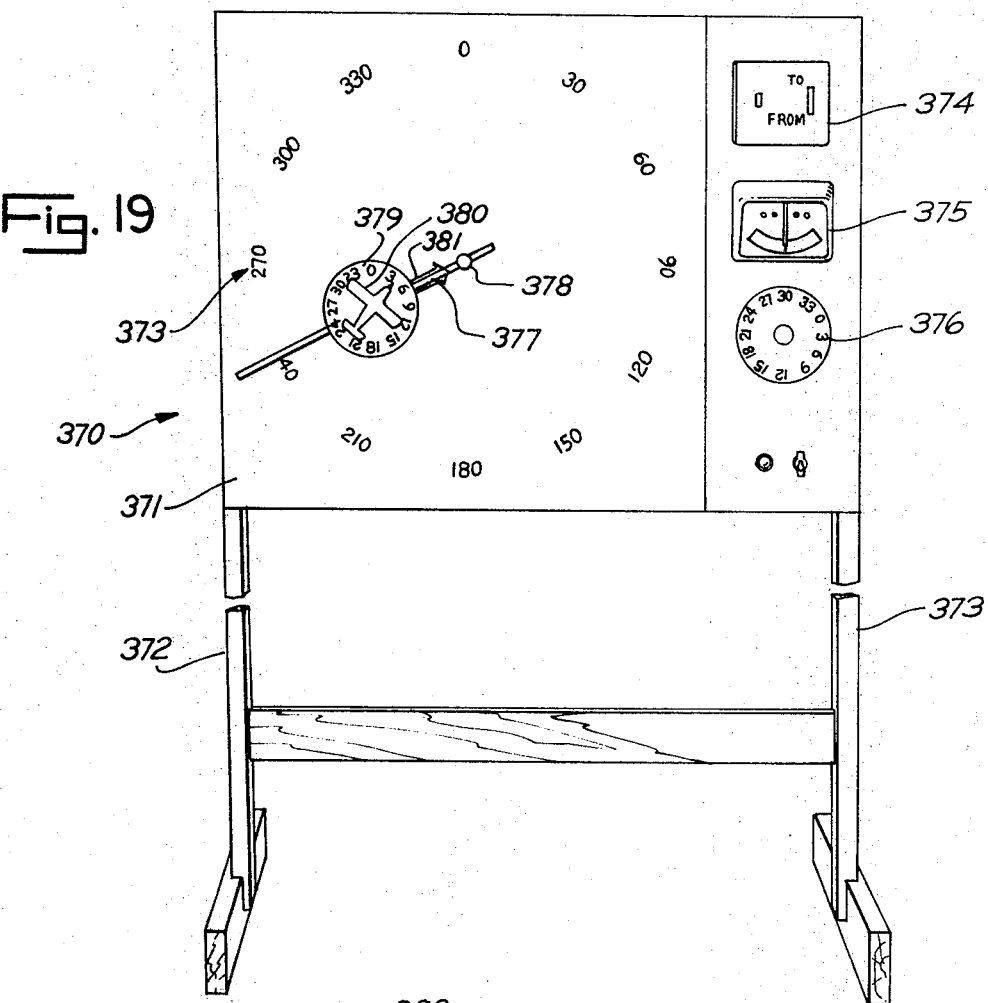
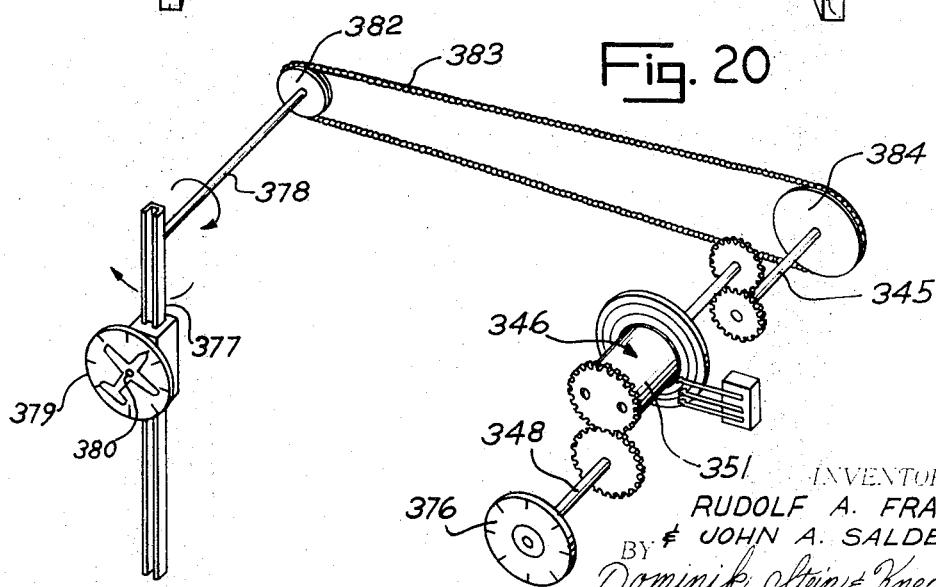
INVENTORS
RUDOLF A. FRASCA
& JOHN A. SALDEEN
BY Dominik, Stein & Knechtel
ATTORNEYS Oct. 20, 1970 R. A. FRASCA ET AL 3,534,486
AVIATION TRAINER Filed March 20, 1968 8 Sheets-Sheet 8

INVENTORS
RUDOLF A. FRASCA
& JOHN A. SALDEEN
BY
Dominik, Stein & Knechtel
ATTORNEYS United States Patent Office 3,534,486
Patented Oct. 20, 1970

3,534,486
AVIATION TRAINER
Rudolf A. Frasca, 606 S. Neil St., and John A. Saldeen, 1813 Crescent Drive, both of Champaign, Ill. 61820
Continuation-in-part of application Ser. No. 476,249, Aug. 2, 1965. This application Mar. 20, 1968, Ser. No. 714,671
Int. Cl. G09b 9/08
U.S. Cl. 35—12
22 Claims

ABSTRACT OF THE DISCLOSURE

An aviation trainer which is primarily mechanically operated and essentially constitutes a miniature airplane which simulates flight conditions by displaying appropriate readings on instruments in the cockpit of the trainer. During operation, the trainer sits immovable upon a solid surface and simulates flight conditions solely by reference to the instruments on the instrument panel thereof. The trainer further includes a model airplane and a horizon gridboard which aid in instruction in contact flying. The gridboard also serves as a projection screen for programmed instruction. A radial navigation console which provides simulation of VOR, ADF, localizer and marker lights also is provided.

---

This application is a continuation-in-part of copending application, Ser. No. 476,249, filed Aug. 2, 1965, now Pat. No. 3,378,938, by Rudolf A. Frasca, entitled, "Aviation Trainer."

In the above-mentioned copending application, an aviation trainer is disclosed which is primarily mechanically operated and essentially constitutes a miniature airplane which simulates flight conditions by displaying appropriate readings on instruments in the cockpit of the trainer. During operation, the trainer sits immovable upon a solid surface and simulates flight conditions solely by reference to the instruments on the instrument panel. The trainer is rather sophisticated and includes apparatus which is designed to realistically simulate most of the actual flight characteristics of an aircraft, including the inherent stability of an aircraft to recover and straighten out on a pre-established level flight attitude when the stick is positioned to momentarily position the elevator at a climb or dive attitude.

The trainer of the present invention is generally like the trainer of the copending application improved, however, to ideally suit it for high schools, junior colleges, colleges, and military, civilian and overseas flight training operations in teaching the basics of contact and instrument flying for the private pilot, instrument and commercial ratings. The flight characteristics simulate, among other things, the effects of torque, adverse yaw, automatic nose-drop with bank, airspeed drop-off with turn, and realistic control centering. Less than one hour of setup time is required to ready the trainer for operation.

The trainer of the present invention includes a model airplane and a horizontal gridboard which aid in instruction in contact flying. A pop-up cover blocks the view of the contact flying references for full instrument flying by the student. In addition, the gridboard serves as a projection screen for programmed instruction.

Another feature of the trainer of the present invention is the provision of a radio navigation console which provides simulation of VOR, ADF, localizer and marker lights. The recorder moves about the console in relation to the heading being flown in the trainer. The track may be adjusted to duplicate a wind from the left or the right. If desired, the recorder can be easily disconnected. The track, furthermore, is visible from the trainer's cockpit, however, a cover can be instantaneously installed to restrict the student's vision of the console, if desired.

A projector/recorder can be provided to allow the student to learn individually, and as rapidly as his talents permit. Accordingly, the disclosed trainer can be used on a programmed training course with minimal aid of an instructor.

Among the various instruments included in the trainer is a two-dimensional artifical horizon, directional gyro, altimeter, rate of climb, airspeed, turn and bank, tachometer, gas selector, mixture control, ignition switch, stall warner, dummy carburetor heat control, electric trim, ADF, VOR course selector, and a three light marker system. If desired, a second VOR course selector and station can be provided, for cross-station reference. The second VOR also can be used as a localizer.

It is therefore an object of the present invention to provide an improved aviation trainer for simulating the actual flight characteristics of an aircraft, as realistically as possible.

It is a further object to provide a trainer which incorporates a mechanical computer which operates to provide readings on the instruments in the trainer, responsive to movements of a control stick, throttle, and rudder pedals, and to properly correlate such readings.

It is a still further object to provide an aviation trainer which relies primarily upon mechanical linkages and thus is highly reliable, resistant to damage and virtually maintenance free.

A still further object is to provide an aircraft trainer capable of simulating flight conditions which is easily transportable and can be readily moved about without elaborate preparations or installation problems.

Still another object is to provide an aviation trainer which is particularly adapted for instruction in contact flying.

A still further object is to provide an aviation trainer of the above-described type including a radio navigation system for providing simulation of VOR, ADF, localizer and marker lights.

Still another object is to provide an aviation trainer which can be used on a programmed training course with minimal aid of an instructor.

In particular, it is an object of the present invention to provide a ground instrument trainer which is ideally suited for high schools, junior colleges, colleges, and military, civilian and overseas flight training operations in teaching the basics of contact and instrument flying for the private pilot, instrument and commercial ratings.

Other objects of the invention will in part be obvious and will in part appear hereinafter.

The invention accordingly comprises the features of construction, combination of elements, arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIG. 1 is a perspective view of an aviation trainer exemplary of the present invention;

FIG. 2 is a partial perspective view of the aviation trainer of FIG. 1, illustrating its instrument panel;

FIG. 3 is a schematic representation of the controls used in the trainer with linkages and operating members shown connecting the controls to the instrument;

FIG. 4 is a schematic representation of the centering and trim system used with the aviation trainer of FIG. 1;

FIG. 5 is a partial schematic representation of the linkage means used to maneuver the model airplane pivotally affixed atop the aviation trainer of FIG. 1;

FIG. 6 is a top plan view of the recorder of the navigational console;

FIGS. 7 and 8 are side and end plan views respectively, of the recorder of FIG. 6, with its housing removed;

FIG. 9 is a top perspective view of the navigational console affixed to the aviation trainer of FIG. 1;

FIG. 10 is a view taken generally along lines 10—10 of FIG. 9, generally illustrating the internal construction of the support arm thereof;

FIG. 11 is a view of the support arm taken generally along lines 11—11 of FIG. 9;

FIG. 12 is a partial top plan view of the navigational console, generally illustrating its construction;

FIG. 13 is a sectional view taken along lines 13—13 of FIG. 12;

FIG. 14 is a sectional view taken along lines 14—14 of FIG. 12;

FIG. 15 is a sectional view taken along lines 15—15 of FIG. 12;

FIG. 16 is a sectional view taken along lines 16—16 of FIG. 12;

FIG. 19 is a view generally illustrating a VOR display board which can be constructed using the techniques employed with the aviation trainer;

FIG. 20 is a schematic representation of the control circuitry for the VOR display board of FIG. 19;

Similar reference characters refer to similar parts throughout the several views of the drawings.

Figure 17:
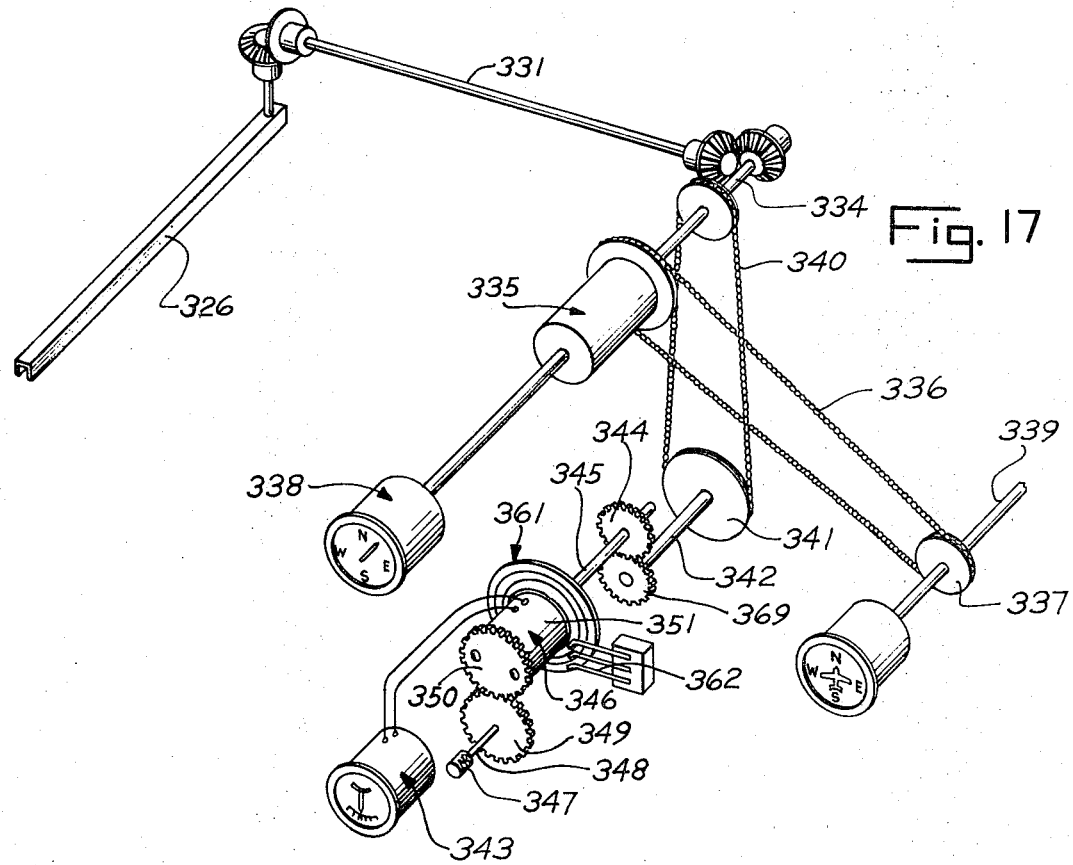
FIG. 17 is a schematic representation of the input arrangement to the ADF and VOR instruments of the trainer.

Referring now to the drawings, in FIG. 1 a stationary aviation trainer 10 is shown incorporating a fuselage 11 having space provided therein for seating a pilot trainee in a position where he can readily operate the various controls. The trainer is further designed so that a hood (not shown) can be placed over the cockpit of the trainer to eliminate any distractions for the trainee, allowing him to concentrate his attention on the instruments and controls. A radio navigation console 12 is affixed to one side of the fuselage 11 and provides simulation of VOR, ADF, localizer and marker lights in a manner described more fully below. Affixed atop the fuselage 11 in front of the cockpit of the trainer is a model airplane 13 and a horizon gridboard 14 to aid in instructing the pilot trainee, in contact flying. A pop-up cover 15 also is hingedly affixed atop the fuselage 11 and can be used to block the view of the contact flying references for full instrument flying by the pilot trainee. The gridboard 14 also serves as a projection screen for a projector/recorder 16 affixed to the rear of the fuselage 11. The projector/recorder 16 can be used for programmed instructions to permit the pilot trainee to learn individually and as rapidly as his talents permit. With this arrangement, minimal aid of an instructor is required. Mounted on the instrument panel of the trainer are an artificial horizon 17, a directional gyro 18, an altimeter 19, a rate of climb indicator 20, an airspeed indicator 21, a turn and bank indicator 22, a tachometer 23, a gas selector 24, a mixture control 25, ignition switch 26, a master switch 27, a dummy carburetor heat control 28, and an electric trim control 29. An ADF indicator 338, a VOR course selector 343, and a marker light system 68 including three marker lights also are provided. The trainer 10 is flown by means of a control stick (or wheel) 30, rudder pedals 235 and 236 and a throttle 70, in the manner fully described below.

In FIG. 3 there is shown a diagrammatic representation of the various flight controls, the instrument panel instruments and the various connections and linkages therebetween, of the trainer. The control stick 30, for purposes of illustration, is shown pivotally mounted by means of a pin 77 on a rod 120. The rod 120 in turn is journaled in bearings 78 and 79. Movement of the control stick 30 results in a change in the reading on various instruments by means of mechanical connection. For reference purposes, directions have been indicated above the control stick 30 representing movements of the stick in four directions in which "L" stands for left movement, "R" for right movement, "F" for forward movement, and "B" for backward movement.

If the control stick of an aircraft is moved forward, and then returned to a neutral position, it is expected that the aircraft will assume a nose down, or diving attitude and that the airspeed of the aircraft will increase. Also, the altimeter, the rate of climb and the artificial horizon indicator will likewise indicate the change in the aircraft's attitude. The instruments will indicate a return to straight and level flight, after the control stick is returned to the neutral position. These changes are simulated and indicated on the trainer's instruments, as described below. In moving the control stick 30 forward, the connecting rod 31 is caused to move to the right and thereby cause lever arm 32 to rotate counter-clockwise (CCW) about its anchor 33. This rotational movement of lever arm 32 pulls connecting rod 34 down, which action, in turn, causes the lever arm 35 to rotate CCW about coupler 36. CCW rotation of lever arm 35 pulls connecting rod 37 to the left, causing lever arm 38 to rotate CCW about coupler 187 and move shaft 39 of ball disc integrator 40. Forward movement of shaft 39 results in CCW rotation of worm gear 41 and CCW rotation of wheel gear 42, and hence movement of lever arm 43 to the left. This action, in turn, causes connecting rod 44 to move to the left, to cause lever arm 45 to both move to the left and to rotate CCW about coupler 46. Lever arm 47 thereby is caused to rotate CCW about its anchor 48 and pull connecting rod 49 to the left. The rate of climb indicator 20 is adjusted to indicate that the airplane is descending. Connecting rod 50 also is pulled to the left and the output of the integrator 51 is such as to cause the altimeter 19 to indicate that the altitude of the airplane is decreasing.

Lever arm 45 also pulls the connecting rod 52 to the left as it moves laterally and pushes connecting rod 53 to the right as it rotates. Connecting rod 52 causes the artificial horizon 17 to indicate that the airplane is descending. Connecting rod 53 causes the lever arm 54 to rotate CW with connecting rod 56 which is fixed and can only rotate. This causes connecting rod 55 to move to the right. Tachometer 23 thereby is caused to indicate an increase in engine r.p.m.

Connecting rod 56 in rotating CW causes lever arm 57 to rotate CW to, in turn, cause lever arm 59 to move to the right, which action is translated by an airspeed lag system 60, to cause the airspeed indicator 21 to indicate an increase in airspeed.

Connecting rod 61 is coupled to the lever arm 62 and the latter is coupled to lever arm 43, by coupler 63. As lever arm 43 is moved to the left, lever arm 62 is caused to rotate CCW about connecting rod 76 which is held fixed at this time and thereby causes connecting rod 61 to move to the right. This movement causes lever arm 64 to rotate CCW about coupler 65 and thereby causes connecting rod 66 to move to the right. Connecting rod 66 is coupled to the lever arm 54 and the latter's position is readjusted CW about connecting rod 56. This action moves lever arm 35 to the right to, in turn, move connecting rod 37 to the right. Connecting rod 37 in moving to the right causes the lever arm 38 to rotate CW about connecting rod 187. The shaft 39 of the ball disc integrator 40 is moved to the right which movement results in a CW rotation of worm gear 41 and CW rotation of wheel gear 42, and hence, movement of lever arm 43 to the right. This action, in turn, causes connecting rod 44 to move to the right, to cause lever arm 45 to both move to the right and to rotate CW about coupler 46. Lever arm 47 thereby is caused to rotate CW about its anchor 48 and pull connecting rod 49 to the right. The rate of climb indicator 20 is adjusted to indicate that the airplane is leveling out. Connecting rod 50 also is pulled to the right and the output of the integrator 51 is such as to cause the altimeter 19 to indicate that the attitude of the airplane is now stable.

Lever arm 45 also pulls the connecting rod 52 to the right as it moves laterally and pulls connecting rod 53 to the left as it rotates. Connecting rod 52 causes the artificial horizon 17 to indicate that the aircraft is in level flight. Connecting rod 53 in moving to the left causes the lever arm 54 to rotate CCW about connecting rod 56, which action, in turn, causes connecting rod 55 to move to the left. Tachometer 23 thereby is caused to indicate a decrease in engine r.p.m.

Connecting rod 56 is rotated CCW and causes lever arm 57 to rotate CCW, and this rotation causes lever arm 59 to move to the left, which action is translated by the airspeed lag system 60, to cause the airspeed indicator 21 to indicate a decrease in airspeed. Accordingly, it can be seen that connecting rod 66 forms a feed back loop for operating the instruments to cause them to reflect the attitude of the aircraft in accordance with the airspeed for which it is trimmed.

If the control stick of an aircraft is moved right or left, it is expected that the aircraft would bank to the right or left, depending upon the direction in which the control stick is moved. It is also expected that the aircraft would assume a nose down attitude. A slight backward movement of the control stick is generally applied to compensate for the nose drop, to maintain level flight, and when so applied it is found that the airspeed generally decreases slightly as a result of the bank.

Whenever the ailerons of an actual aircraft are deflected from their centered positions, the nose of the aircraft tends to swing in the opposite direction because of aileron drag. This is generally referred to as adverse yaw. In order to perform a coordinated turn, the rudder must be used to bring the tail of the aircraft around to the proper direction of the turn. In most light aircraft, right aileron and the proper amount of right rudder is required to perform a coordinated turn to the right. Correspondingly, left aileron and left rudder are required to perform a coordinated turn to the left. When rolling out of a turn, that is, returning the aircraft to straight and level flight, the use of left aileron and left rudder must be coordinated, if the turn was to the right. Right aileron and right rudder, of course, are coordinated when rolling out of a turn to the left.

These expected results are simulated on the instruments of the trainer 10, as follows. When the control stick 30 is moved to the left, the control rod 120 will be rotated with a corresponding movement and will, in turn, rotate the lever arm 121 CCW. Lever arm 121, in turn, moves the connecting rod 122 downward, and this action causes the lever arm 123 to rotate CW about its anchor 124. Connecting rod 125 is moved to the right by this movement of the lever arm 123, and causes the lever arm 126 to rotate CCW about its anchor 127. Lever arm 126 in rotating CCW about its anchor 127 moves connecting rod 167 to the left. This movement of the connecting rod 167 causes the lever arm 166 to rotate CW about the end of connecting rod 165. This CW rotation of lever arm 166, in turn, causes the coupler 169 and the lever arm 168 to move to the left and the lever arm 168 to rotate CCW. The input shaft 170 of the adverse yaw system 171 is thereby caused to rotate in CCW direction. Its output shaft 172 and the lever arm 173 affixed to it are thereby caused to rotate in a CCW direction. This rotation of the lever arm 173 causes the connecting rod 174 to move downwardly, which action, in turn, causes the lever arm 175 to rotate in a CCW direction, about the coupler 176. Connecting rod 151 thereby is caused to move to the left which action causes the lever arm 149 to rotate CW about the coupler 150. This CW rotation of the lever arm 149 moves the connecting rod 152 to the left. This movement of the connecting rod 152 causes the lever arm 153 to rotate CCW about its anchor 154. The CCW rotation of the lever arm 153 moves the connecting rod 155 to the left to, in turn, cause the needle of the turn and bank indicator 22 to move to the right. This CCW rotation of the lever arm 153 causes the lever arm 158 to rotate CCW about the end of the connecting rod 160. The connecting rod 161 thereby is caused to move to the right which movement causes the ball of the turn and bank indicator 22 to move to the left.

Lever arm 126 in rotating CCW also moves connecting rod 128 to the right which, in turn, causes lever arm 129 to rotate CCW about its anchor 130 and pull connecting rod 131 downwardly. Connecting rod 131 is connected to the lever arm 132 and causes it to rotate CCW about coupler 133. Connecting rod 134 is moved to the left and, in turn, causes lever arm 135 to rotate CCW about its anchor 136. This rotation of the lever arm 135 causes forward movement of the shaft 137 (to the left) which movement results in CW rotation of worm gear 138 of the ball disc integrator 139 and CW rotation of wheel gear 140. Lever arm 141 and connecting rods 142 and 143 affixed to it all are moved to the right. Connecting rod 143 causes the artificial horizon 17 to indicate a bank to the left, as expected. Connecting rod 142 causes lever arm 144 to rotate CW about its anchor 145. Connecting rod 146 is moved to the right, and causes lever arm 147 to rotate CW about its anchor 148. Lever arm 149 is coupled to lever arm 147 by coupler 150 and is caused to both move to the right and to rotate CW about connecting rod 151. This movement of the lever arm 149 moves the connecting rod 152 to the right which action, in turn, causes lever arm 153 to rotate CW about its anchor 154. Connecting rod 155 thereby is moved to the right and this action, in turn, moves the needle of the turn and bank indicator to indicate a turn to the left.

Connecting rod 156 connected to the lever arm 153 also is moved to the right, and this movement is translated by the integrator 157 to cause the directional gyro 18 to indicate a heading change, as a result of a left turn or bank.

The lever arm 158 is coupled to the lever arm 153 by coupler 159, and connecting rod 160 connects the lever arm 158 to the lever arm 147. The connecting rod 160 is moved to the right when the lever arm 147 is caused to rotate CW about its anchor 148, as described above. This action tends to cause the lever arm 158 to rotate CCW about coupler 159 to, in turn, cause connecting rod 161 to move to the right. Lever arm 158, however, also is moved forward (to the right) by the lever arm 153 as the latter is caused to rotate CW about its anchor 154 so that the movement of the connecting rod 161 to the right is only a slight movement. Connecting rod 161 is coupled to the ball of the turn and bank indicator 22 and causes the ball thereof to indicate a slip.

This slip is corrected by applying left rudder. In doing so, connecting rod 165 is moved to the right and, in turn, causes the lever arm 166 to rotate CW about connecting rod 167. Lever arm 168 coupled by coupler 169 to the lever arm 166 is caused to rotate CW about input shaft 170 of the adverse yaw system 171 which action, in turn, causes the output shaft 172 thereof and lever arm 173 affixed to it to rotate CW. Connecting rod 174 is moved upwardly and, in turn, causes lever arm 175 to rotate CW about coupler 176. CW rotation of lever arm 175 moves connecting rod 151 to the right which movement, in turn, causes the lever arm 149 to rotate CCW about coupler 150. This CCW rotation of the lever arm 149 moves connecting rod 152 to the right so that the lever arm 153 is caused to rotate CW about its anchor 154. Connecting rod 160 is held fixed at this time so that the lever arm 158 is caused to rotate CW about the connecting rod 160. This action causes connecting rod 161 to move to the left, to cause the turn and bank indicator to indicate a proper turn. That is, a slip no longer is indicated. Too much rudder, however, will cause a skid, as is well known, and this also will be indicated if it occurs.

When the lever arm 144 is caused to rotate CW about its anchor 145, in the manner described above, connecting rod 180 is moved to the left. This action causes lever arm 181 to rotate CCW with connecting rod 183 which is fixed and can only rotate. Lever arm 184 affixed to the connecting rod 183 is rotated CCW and causes lever arm 64 coupled to it by coupler 65 to rotate CCW about the end of connecting rod 66. Lever arm 186 affixed to the connecting rod 183 also is caused to rotate CCW to cause the lever arm 38 to rotate CCW about the end of the connecting rod 37 which is held fixed at this time. This movement of the lever arm 38 moves the shaft 39 of the integrator 40 to the left, which movement is in the same direction that the shaft 39 is moved when the control stick 30 is moved forward, as described above. Accordingly, the artifiical horizon 17, altimeter 19 and rate of climb indicator 20 all are caused to indicate that the aircraft is descending slowly, in a nose-down attitude.

When the control stick 30 is pulled backward to compensate for the nose drop, the connecting rod 31 is moved to the left and, in turn, causes the lever arm 32 to rotate CW about its anchor 33. This rotational movement of lever arm 32 pushes connecting rod 34 upward, which action, in turn, causes the lever arm 35 to rotate CW about coupler 36. This CW rotation of lever arm 35 pushes connecting rod 37 to the right, causing lever arm 38 to rotate CW about the coupler 187. This rotation of the lever arm 38 moves the shaft 39 of the integrator 40 to the right, or in the opposite direction in which it is moved when the control stick 30 is moved forward. The readings on the artificial horizon 17, altimeter 19 and the rate of climb indicator 20 therefore all are adjusted to indicate the change in attitude.

There will be a slight adjustment in the airspeed through the operation of the lever arms 54 and 57, the connecting rods 56 and 59, and the airspeed lag system 60, when the control stick 30 is moved backward to compensate for the nose drop. A slight decrease in airspeed should result.

Lever arm 188 provides a yaw input to bank, to simulate the effect of applying rudder without applying bank. For example, if the left wing is low, an aircraft will tend to bank or turn to the left. The left wing can be brought up, for straight and level flight, by applying right rudder. In FIG. 3, when banking to the left, connecting rod 134 will be moved to the left. When right rudder is applied, connecting rod 174 will be pulled down, by the action of the adverse yaw system 171, to cause lever arm 175 to rotate CCW about coupler 176. This, in turn, moves connecting rod 189 to the left which movement causes lever arm 188 to rotate CW about its anchor 190. This movement, in turn, moves lever arm 132 to the right. Connecting rod 134 likewise is moved to the right, or in the opposite direction as it is moved when banking to the left. Hence, the left wing effectively is raised. In this same manner, a heading may be maintained, using rudder.

When the throttle of an aircraft is operated to change the airspeed of the aircraft, there is generally some change in the aircraft's attitude. For example, when full throttle is applied, as during take off, the nose of the aircraft will pull to the left, due to the engine's torque. To compensate for this action, right rudder is applied. This action, as well as the other normally expected attitude changes which occur when the throttle is advanced, or retracted, are simulated with the trainer 10.

If the throttle of the trainer is advanced, without movement of its control stick or rudder pedals, the trainer's instruments should indicate an increase in airspeed and some gaining in altitude. Also, the tachometer should indicate an increase in r.p.m., and the artificial horizon should show a nose high attitude. After the initial gain in airspeed, the airspeed should tend to stabilize at its trim speed and there should be a continuing increase in altitude. Referring now to FIG. 3, it can be seen that the trainer's instruments actually indicate these expected changes in their readings or indications.

When throttle 70 is advanced (moved to the left), lever arm 71 is caused to rotate CW about its anchor 72 and thereby pull connecting rod 73 to the right. This movement, in turn, causes lever arm 74 to rotate CCW about its anchor 75. CCW rotation of lever arm 74 moves connecting rod 76 to the right which action, in turn, causes lever arm 62 to rotate CCW about coupler 63. Lever arm 62, in rotating, moves connecting rod 61 to the right, and the connecting rod 61, in turn, causes lever arm 64 to rotate CCW about coupler 65. CCW rotation of lever arm 64 moves connecting rod 66 to the right, which movement is in the same direction in which it is moved when the control stick 30 is moved forward, hence it would be expected that the airspeed indicator and the tachometer will be operated to indicate an increase, as previously indicated. It can be seen that this actually occurs. The connecting rod 66, in this case, causes the lever arm 54 to rotate CW about connecting rod 56. Lever arm 54, in turn, moves connecting rod 55 to the right, to thereby cause the tachometer to indicate an increase in r.p.m. Connecting rod 56 is rotated CW and, in turn, causes lever arm 57 to rotate CW. Connecting rod 59 thereby is moved to the right and this movement is translated by the airspeed lag system 60 and caused to adjust the airspeed indicator 21 to indicate an increase in airspeed. Accordingly, both an increase in airspeed and in engine r.p.m. is indicated, as expected.

The CW rotation of lever arm 54 also moves connecting rod 53 to the right and this movement, in turn, causes lever arm 45 to rotate CCW about connecting rod 44. Lever arm 45, in rotating, moves connecting rod 52 to the right, to cause the artificial horizon 17 to indicate a nose high attitude, as expected. Coupler 46 affixed to the lever arms 45 and 47 causes the lever arm 47 to rotate CW about its anchor 48. This rotation of lever arm 47 moves connecting rods 49 and 50 to the right. Connecting rod 49 causes the rate of climb indicator 20 to indicate that the trainer is climbing, as expected, and the movement of the connecting rod 50 is translated by the integrator 51 and caused to adjust the altimeter 19 to indicate an increase in altitude, also as expected. The lever arm 54 in rotating CW moves the lever arm 35 to the right, which action in turn, moves the connecting rod 37 to the right. The connecting rod 37 in moving to the right, causes the lever arm 38 to rotate CW about coupler 187 which action in turn, moves the input shaft 39 of the integrator 40 to the right. The worm gear 41 and the wheel gear 42 are caused to rotate CW, which rotation moves the lever arm 43 to the right. Lever arm 43 in moving to the right causes the lever arm 62 to rotate CW about the end of connecting rod 76. The CW rotation of the lever arm 62 causes connecting rod 61 to move to the left which action, in turn, causes the lever arm 64 to rotate CW about coupler 65. CW rotation of the lever arm 64 moves the connecting rod 66 to the left and this, in turn, causes the lever arm 54 to be rotated in a CCW direction, about the connecting rod 56. This CCW rotation of lever arm 54 adjusts the airspeed of the aircraft.

When the throttle of an aircraft is advanced, the engine's torque pulls the nose of the aircraft to the left. This action, as indicated above, usually is compensated for, by applying right rudder. This action is simulated as follows. When lever arm 74 is caused to rotate CCW about its anchor 75 as the throttle 70 is advanced, the connecting rod 80 is moved to the right. This movement causes the lever arm 81 and the lever arm 83 coupled to it by the coupler 82 to rotate CCW. Lever arm 83 in rotating CCW causes coupler 176 and lever arm 175 to move to the right. This movement of the lever arm 175 moves the connecting rod 151 to the right, which movement causes the lever arm 149 to rotate CCW about coupler 150. Connecting rod 152 is caused to move to the right which, in turn, causes lever arm 153 to rotate CW about its anchor 154. Lever arm 153 rotating moves connecting rod 155 to the right which action causes the needle of the turn and bank indicator 22 to move to the left.

Lever arm 153 also causes lever arm 158 to rotate CW about the end of connecting rod 160. This action causes connecting rod 161 to move to the left which action, in turn, causes the ball of the turn and bank indicator to move to the right.

Lever arm 175 in moving to the right causes the lever arm 188 to rotate CCW about its anchor 190. Lever arm 188 in rotating moves the lever arm 132 to the left, which in turn, moves the connecting rod 134 to the left. This movement of the connecting rod 134 causes the lever arm 135 to rotate CCW about its anchor 136. This action moves the input shaft 137 of the integrator 139 to the left and its output shaft and the worm gear 138 is caused to rotate in a CW direction. Wheel gear 140 likewise is caused to rotate in a CW direction, and this action moves the lever arm 141 to the right. Connecting rods 142 and 143 connected to the lever arm 141 also are moved to the right. The connecting rod 143 causes the ball of the turn and bank indicator 22 to move slightly to the left, however, the ball is still to the right indicating that right rudder is required. The connecting rod 142 in moving to the right, causes the lever arm 144 to rotate CW about its anchor 145. Lever arm 144 in rotating causes the connecting rod 146 to move to the right to, in turn, cause the lever arm 147 to rotate CW about its anchor 148. Lever arm 149 is caused to rotate CW about the end of connecting rod 151. The connecting rod 152 thereby is caused to move to the right to, in turn, cause the lever arm 153 to rotate CW about its anchor 154. Lever arm 153 in rotating CW about its anchor 154, causes the lever arm 158 to rotate CW about the end of connecting rod 161 so that the ball of the turn and bank indicator 22 is not moved to any appreciable extent.

The effect of torque is compensated for by applying right rudder. In doing so, the connecting rod 165 is moved to the left, which action, in turn, causes the lever arm 166 to rotate CCW about the end of the connecting rod 167 which is now held fixed. The CCW rotation of the lever arm 166 causes the coupler 169 and the lever arm 168 to rotate the input shaft 170 of the adverse yaw system 171 in a CCW direction. Output shaft 172 likewise is caused to rotate in a CCW direction to, in turn, rotate the lever arm 173 CCW and pull the connecting rod 174 downwardly. Downward movement of the connecting rod 174 causes the lever arm 175 to rotate CCW about the coupler 176. This rotation of the lever arm 175 causes the connecting rod 151 to move to the left which action, in turn, causes the lever arm 149 to rotate CW about the coupler 150. Lever arm 149 in rotating causes the connecting rod 152 to move to the left to, in turn, cause the lever arm 153 to rotate CCW about its anchor 154. Lever arm 153 rotates the lever arm 158 CCW about the end of the connecting rod 160 which action, in turn, causes the connecting rod 161 to move to the right, bringing the ball back to the center position. The lever arm 153 in rotating CCW about its anchor 154 moves the connecting rod 155 to the left to center the needle of the turn and bank indicator 22. Conversely, when power is reduced below trimmed airspeed, the aircraft has the tendency to nose down and bank to the right requiring left rudder to maintain straight flight. It can therefore be seen that the torque resulting from increasing or decreasing power by operating the throttle 70 is realistically compensated for by the trainer 10.

In an aircraft, when the control wheel or stick is moved from its center neutral position, the ailerons are deflected and the aircraft is caused to bank, either to the right or to the left, depending upon which way the control wheel is rotated. The air, or slipstream, moving over the wings of the aircraft, against the ailerons, tends to center the control wheel, and the pressure required to turn the control wheel from the center position increases as it is turned to extreme positions. The pressure increases substantially exponentially, as a function of airspeed.

Also, when the control wheel, or stick, is moved forward or backward, the elevators are deflected and the aircraft is caused to climb or dive. In this case also, the air or slipstream, flowing against the elevators tends to center the control wheel, and pressure is required to maintain the elevators in a deflected position. The pressure required increases substantially exponentially as a function of airspeed, as the control wheel is moved to extreme positions.

With respect to elevator deflection, trim controls are generally provided which are operable to deflect the elevators, or a portion of them, to maintain the aircraft on straight and level flight, at a fixed altitude. The trim control effectively counteracts the forces acting on the aircraft, to maintain a fixed attitude.

In a trainer, it is highly desirable to simulate the pressure on the control wheel when it is turned to the right or left, or when it is moved forward or backward, so that the trainer has a realistic feel. This pressure is realistically simulated by incorporating the centering control system shown in FIG. 4 into the trainer.

The centering control system includes an upright frame 200 which is pivotally mounted upon a shaft 201 retained by a pair of pillow blocks 202 and 203 secured to the floor of the trainer. The control wheel 30 is connected to a shaft 209 which is passed through the instrument panel (not shown in FIG. 4) of the trainer. The shaft 209 also is extended through and is rotatably retained within a tubular sleeve 212 formed integrally with the frame 200, at its upper end, and a sprocket 204 is affixed to its end. The sprocket 204 is drivingly coupled by a drive chain 210 to another sprocket 205 which is rotatably supported upon a shaft 206 affixed to the frame 200 and has a lever arm which corresponds to the lever arm 121 illustrated in FIG. 3, fixedly secured to it. The lever arm 121, as can be seen in FIGS. 3 and 4 is coupled by means of the connecting rod 122 to the lever arm 123 which is rotatably supported upon a shaft 211 affixed to the frame 200. The shaft 211 and the frame 200 constitute the anchor 124. The lever arm 123 is, in turn, coupled by means of connecting rod 125 to the lever arm 126, and the latter has the connecting rod 128 affixed to and operated by it. The connecting rod 128 controls the operation of the mechanical computers, lever arms and the like, for causing the various instruments of the trainer to indicate the bank attitude of the aircraft.

The connecting rod 31 illustrated in FIG. 3 can be seen, in FIG. 4, connected to the frame 200 and to the lever arm 32 which is anchored by means of the anchor 33. The connecting rod 34 is affixed to and operated by the lever arm 32, to cause the trainer's instruments to indicate the pitch attitude of the aircraft.

A shaft 215 is secured to the frame 200, and its end is slidably engaged and retained within an elongated slot 216 formed in a pivot arm 217. The upper end of the pivot arm 217 is pivotally secured by means of a pivot pin 218 to a threaded bearing block 219, and its lower end is pivotally affixed to a piston rod 221 of a hydraulic cylinder 222. The lower end of the hydraulic cylinder 222 is pivotally affixed to the floor of the trainer, by means of a bracket assembly 223. The threaded bearing block 219 is threadedly received on a threaded shaft 225 which is fixedly and rotatably supported by means of bearing assemblies 220 and 226. An electric motor (not shown) is coupled to and adapted to rotate the shaft 225 to adjust the trim of the aircraft, in a manner described below. The electric motor is controlled by the trim switch 29 affixed to the instrument panel (FIG. 1).

The piston rod 228 of a hydraulic cylinder 229 is pivotally affixed to a bracket arm 230 which is fixedly secured to the shaft 209 supporting the control wheel 30. The opposite end of the hydraulic cylinder 229 is pivotally affixed to a support shaft 231 which is fixedly secured to the frame 200.

With the above-described structure, when the control wheel 30 is rotated to the right or left, the bracket arm 230 likewise is rotated. This movement of the bracket arm 230 pulls the piston rod 228 out of the hydraulic cylinder 229. The operation of the hydraulic cylinder 229 resists the movement of the control wheel 30, and thereby creates a pressure on the control wheel which simulates the pressure experienced on the control wheel in an actual aircraft. When the control wheel 30 is released, it will be automatically centered, by the action of the piston rod 228 being retracted into the hydraulic cylinder 229.

Also, when the control wheel 30 is rotated, the sprocket 204 is rotated and, in turn, rotates the sprocket 205, by means of the drive chain 207. Lever arm 121 is caused to, in turn, operate the connecting rod 122, the lever arm 123, the connecting rod 125, the lever arm 126 and the connecting rod 128, to provide the bank input to the trainer.

When the control wheel 30 is moved forward or backward, the pivot shaft 215 bears on the side of the elongated slot 216 formed in the pivot arm 217, and the latter is caused to pivot to pull the piston rod 221 out of the hydraulic cylinder 222. Again, the pressure normally experienced on the control wheel of an actual aircraft is realistically simulated.

The connecting rod 31 also is caused to move when the control wheel 30 is moved forward or backward to, in turn, operate the lever arm 32 and the connecting rod 34. The connecting rod 34 provides a pitch input to the trainer, to simulate the diving or climbing attitude of the aircraft, in the manner described above.

The trim control of the trainer is operated to relieve the pressure exerted on the control wheel 30, as follows. When the piston 221 is pulled from the hydraulic cylinder 222, in the above-described manner, to create a pressure on the control wheel, this pressure can be relieved by operating the electric motor (not shown) to rotate the shaft 225. Rotation of the shaft 225 will cause the threaded bearing block 219 to move forward or backward, depending upon the direction in which the shaft 225 is rotated, to adjust the angular relationship between the pivot arm 217 and the piston rod 221 so that the piston rod 221 is permitted to retract into the hydraulic cylinder 222. The pressure on the control wheel 30 is thereby relieved, and the effect of trimming an actual aircraft is realistically simulated.

The rudder centering system for the trainer 10 is more clearly illustrated in FIG. 4, and it can be seen that the rudder pedals 235 and 236 are fixedly secured in spaced relation to a bar 237 of a parallelogram assembly 241 including the bars 237–240. These bars 237–240 are pivotally affixed together and pivot in the same direction and remain parallel to one another as they are pivoted. A pivot pin 243 is fixedly secured to the bar 237 and to a lever arm 244, and is rotatably supported by a pivot pin support arm 242 which is anchored to the floor of the trainer. A piston rod 245 of a hydraulic cylinder 246 is pivotally affixed to the lever arm 244, and the opposite end of the hydraulic cylinder 246 is pivotally affixed to a bracket assembly 247 which is secured to the floor of the trainer.

When the rudder pedal 235, or 236, is operated, the pivot pin 243 and the lever arm 244 affixed to it are caused to pivotally rotate. As the lever arm 244 rotates, the piston rod 245 is pulled from the hydraulic cylinder 246, to thereby exert a pressure on the rudder pedals to simulate the effect of the slipstream on the rudder of an actual aircraft, when the rudder is deflected. The rudder pedals 235 and 236 return to their centered positions when the pressure exerted upon one of them to operate it is released, by the action of the hydraulic cylinder 246.

The above-described adverse yaw system also is illustrated in FIG. 4. The connecting rod 165 illustrated in FIG. 3 is pivotally connected to the bar 239 and to the lever arm 166. The lever arm 126 is connected to the same lever arm 166, by means of the connecting rod 167. The lever arm 166, in turn, is coupled by means of the coupler 169 to the lever arm 168 affixed to the input shaft 170 of the adverse yaw system 171. The connecting rod 174 is connected to the lever arm 173 which is affixed to the output shaft 172 of the adverse yaw system.

In operation, coordinated left aileron and left rudder provides no input to the adverse yaw system 171 since, as can be seen in FIG. 4, rotation of the control wheel 30 to the left causes the connecting rod 167 to move forward. The forward movement causes the lever arm 166 to rotate CW about the coupler 169. Left rudder 235 causes the connecting rod 165 to move backwards, which movement likewise causes the lever arm 166 to rotate CW about the coupler 169. Accordingly, there is no resultant input to the adverse yaw system 171, since the lever arm 166 merely rotates about the coupler 169 and the lever arm 168 is not caused to move.

If no rudder is applied when the left aileron is deflected, by rotating the control wheel 30 to the left, the connecting rod 165 is held fixed and its end functions as the pivot point for the lever arm 166 so that the latter is caused to rotate CW about it when the connecting rod 167 is moved forward. This action causes the coupler 169 to move forward and, in turn, causes the lever arm 168 and the input shaft 170 of the adverse yaw system 171 to rotate CW. The output to the adverse yaw section 171 is delayed momentarily and then the output shaft 172 is caused to rotate CW. This action, in turn, causes the connecting rod 174 to move upwardly and thereby causes the ball of the turn and bank indicator 22 to be deflected in a direction opposite that of the turn, thus indicating a slip, in the manner described above.

It will also be observed that rudder deflection with no aileron deflection will result in a movement of the needle in the same direction corresponding to the particular rudder which is operated, and movement of the ball in the opposite direction.

As indicated above, the trainer 10 has a model airplane 13 affixed atop its fuselage 11 which functions in conjunction with the horizon gridboard 14 to aid in instructing a pilot trainee in contact flying. The horizon gridboard 14 has a number of spaced apart horizontal lines 260 which are disposed progressively closer together as a horizon 261 is approached, and a number of radially disposed lines 262 which emanate from a center point 263 that is disposed centrally of the longitudinal length of the trainer. The area above the horizon line 261 is colored blue to represent the sky. These converging lines 260 and 262 and the sky provided an appearance which generally represents a distant horizon that can be used as a reference by the pilot trainee.

The model airplane 13 is likewise disposed centrally of the longitudinal length of the trainer, at a height coordinated with the horizon gridboard so that the model airplane appears, to the pilot trainee, to be flying toward the horizon. The model airplane 13 is freely pivotally supported atop a pivot pin 265 and has two connecting rods 266 and 267 affixed to it, for changing its bank and pitch attitudes, in accordance with the attitude of an aircraft, as simulated by the trainer 10. This is accomplished in the following manner, as illustrated in FIG. 5. The connecting rod 266 is extended through the top of the fuselage 11 and is affixed to a lever arm 268 which is pivotally affixed to an anchor 269. The lever arm 268, in turn, is connected to the lever arm 144 of FIG. 3, by means of a connecting rod 270. The lever arm 144 is connected to and pivotally operated by the lever arm 141 which is operated by the output of the ball disc integrator 139, which output corresponds to the simulated bank of an aircraft. The arrangement is such that the model airplane 13 is banked in the same simulated attitude.

The connecting rod 267 likewise is extended through the top of the fuselage 11 and is affixed to a lever arm 271 which is pivotally affixed to an anchor 272. The lever arm 271 is connected by means of a connecting rod 273 to the lever arm 45 of FIG. 3. The lever arm 45 is connected to and operated by the output of the ball disc integrator 40, which output corresponds to the simulated pitch of an aircraft. Again, the arrangement is such that the model airplane 13 is pitched in the same simulated attitude. A pilot trainee therefore can "fly" the model airplane 13, by reference to the horizon gridboard 14 rather than the trainer's instruments, so that he can be instructed in contact flying.

The pop-up cover board 15 can be raised so that it is vertically disposed between pilot trainee and the contact flying references so that the view of the latter is blocked, for full instrument flying by the pilot trainee.

The sky portion of the horizon gridboard 14 also functions as a projection screen for the projection system 16 which can be, for example, a filmstrip/recorder projector or a slide projector/tape recorder system. The provision of the projection system 16 in combination with appropriate visual and audio aids permits the pilot trainee to learn individually, and as rapidly as his talents permit, with minimal aid of an instructor. The projection system 16 can be adapted to automatically, periodically display instruction material on the horizontal gridboard 14, or it can be adapted to be manually operated by the pilot trainee to project the instructional material on the gridboard at his desired speed. The projection system 16 further can be adapted to be operated to display certain explanations as to what a pilot trainee has done wrong during a simulated flight. For example, if the pilot trainee makes a turn and fails to apply proper rubber, the projection system 16 is operated to display an explanation that the turn is not a coordinated turn and that the aircraft is slipping since proper rudder is not being applied.

The radio navigation console 12, as indicated above, provides simulation of VOR, ADF, localizer and marker lights, and includes a console 280 which is removably affixed along one of its sides to the fuselage 11 of the trainer 10 and is supported along its opposite side by a leg 281. A recorder 282 is supported atop the console 280 and is adapted to move about it in a relation to the heading being flown in the trainer. The track may be adjusted to duplicate a wind from the left or the right. This is accomplished as follows.

The console 280, as can be best seen in FIG. 12, has two rods 283 and 284 affixed, in parallel relationship, to each of its two opposite sides. A support rod 286 is extended through the recorder 282 and has its opposite ends affixed to slide assemblies 287 and 288 which are slidably affixed to the rods 283 and 284, respectively. A cable 289 is affixed to the slide assembly 287, extended about pulleys 290–293 affixed to the console 280, and is affixed to the slide assembly 288. Another cable 294 is affixed to the slide assembly 287 extended about pulleys 295 and 296, and affixed to the slide assembly 288. These cables 289 and 294 function to maintain the perpendicular alignment between the support rod 286 and the rods 283 and 284.

The recorder 282, as can be best seen in FIGS. 6–9, includes a housing 298 having motor means 299, a drive wheel assembly 300 and a support mounting assembly 301 depending from it. The support mounting assembly 301 has an aperture 302 for slidably receiving the support rod 286, in a fashion such that the recorder 282 is freely slidable on the support rod 286. The motor means 299 can be a constant speed electric motor, however, in some applications, it may be preferable to use a variable speed electric motor. The motor means 299 is affixed to the drive wheel assembly 300 and its output shaft 303 has a gear 304 of the drive wheel assembly 300 affixed to it. The gear 304 is drivingly coupled to a gear 305, and the latter drives the recorder's drive wheel 306. The drive wheel 306 also functions to plot the track flown by the trainer 10. A source of ink in the form of a wheel-shaped inking pad (not shown) can be engaged with the drive wheel 306 for inking it.

The drive wheel assembly 300 and the motor means 299 are rotatably affixed to the housing 298, by means of a shaft 308 extending through the housing 298 having its one end fixedly secured within a shaft receiving block 309 affixed to the drive wheel assembly. The motor means 299 has a pair of contacts 310 (only one of which is shown) which are slidably engaged with respective ones of a pair of slip ring contacts 311 and 312 extending about the periphery of the housing 298 and having a source of power (not shown) coupled to them, for energizing the motor means. A gear 314 is fixedly secured to the shaft 308 and is engaged with and driven by another gear 315 affixed to a shaft 316. The gear 315 is coupled to and driven by another gear 317 which is, in turn, coupled to and driven by a gear 318 fixedly secured to an input shaft 319. The arrangement is such that the drive wheel 306 is constantly rotatably driven and the drive wheel assembly 300 and the motor means 299 both are rotated through the medium of the gears 318, 317, 315 and 314 and the shaft 308, so that the recorder 282 plots a course on the console 280 corresponding to the input applied to the input shaft 319. A wind from the left or right can be introduced by depressing the knob 320 affixed to the end of the shaft 316, to rotate the latter. It can be seen that this action merely rotates the drive wheel assembly 300 so that its track is offset from the track it would normally follow. A pointer 321 (FIG. 6) is affixed to the shaft 308 and functions in conjunction with a scale 322 on the top of the housing 298 to indicate the heading of the recorder 282 and to provide a gauge to determine the amount of wind introduced. The knob 320 also is depressed to set a heading, or to turn the recorder off.

The input shaft 319 is coupled to and driven by an output from the turn gear box 323, by means of a flexible drive cable 324. Accordingly, whenever the trainer 10 simulates a course change, an output is provided to the directional gyro 18 in the manner described above, and the same output is coupled to and drives the recorder 282 so that it tracks the same course on the console 280.

A guide 325 is affixed atop the shaft 308 of the recorder 282, and is slidably retained within a generally U-shaped channel 326 pivotally affixed to a support arm 327 secured to the fuselage 11. The channel 326 is pivotally positioned by the recorder as the latter moves about the console 280. As can be best seen in FIG. 10, a gear 328 is affixed to a shaft 329 affixed to the guide 325 and is meshed with a gear 330 secured to the end of a drive shaft 331 rotatably supported within the support arm 327. The drive shaft 331 has another gear 332 affixed to its opposite end and this gear 332 is meshed wtih a gear 333 affixed to another drive shaft 334. The drive shaft 334, as can be best seen in FIG. 17, provides an azimuth input to a differential 335. A heading input also is coupled to the differential 335, by means of a positive drive timing belt (chain) 336 coupled between the differential 335 and a drive pulley 337 affixed to another output 339 of the turn gear box 323. The output of the differential 335 is coupled to the ADF indicator 338 and operates the latter so that its pointer always indicates the bearing of an assumed station which in the illustrated case, is the station indicated on the console 280. Accordingly, as the recorder 282 moves about the console 280, it carries the channel 326 with it so that the channel is positioned to provide an azimuth input to the differential 335. The differential 335 also has a heading input coupled to it, and operates the ADF indicator 338 so that it always indicates the bearing of the assumed station. The operation of the ADF indicator found in an actual aircraft therefore is realistically simulated.

Figure 18:
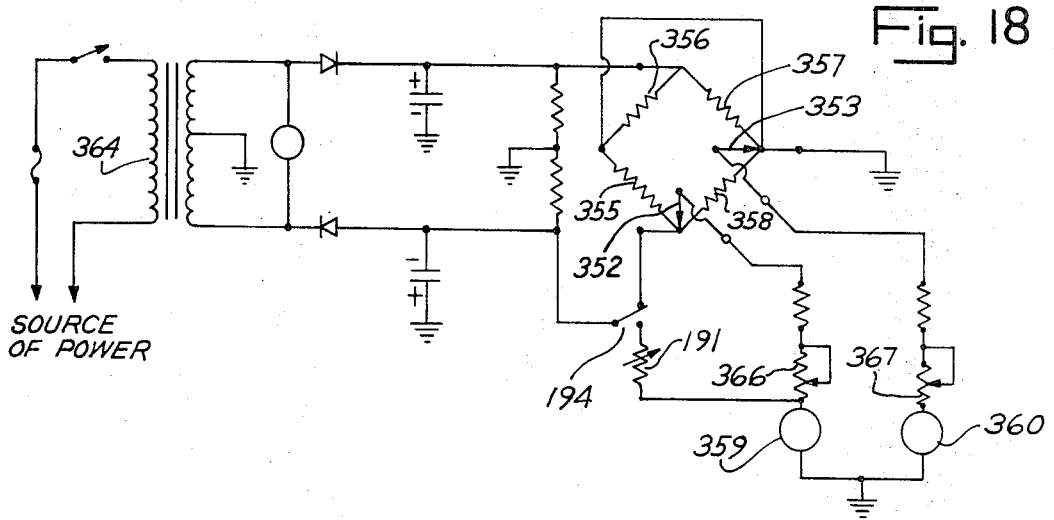
FIG. 18 is an electrical schematic of the sine-cosine pot, and further, generally illustrating the manner in which it is powered and the manner in which it controls the operation of the VOR instrument of the aviation trainer.

The azimuth input to the differential 335 also is coupled by means of a positive drive timing belt (chain) 340 to a drive pulley 341 affixed to a drive shaft 342. A gear 369 also is affixed to the drive shaft 342, and is drivingly engaged with a gear 344 fixedly secured to an input shaft 345 of a sine-cosine pot 346. The sine-cosine pot 346 is energized, as illustrated in FIG. 18, and provides two output signals for controlling the operation of the VOR instrument 343, in a manner described more fully below. The course selector knob 347 of the VOR 343 is affixed to a shaft 348 which has a gear 349 affixed to its ends, and this gear 349 is drivingly engaged with a gear 350 which is fixedly secured to the casing 351 of the sine-cosine pot 346.

The input shaft 345 has two wiper contacts fixedly secured to it, 90° out of phase, as illustrated in FIG. 18, by the contacts 352 and 353. The sine-cosine pot 346 is arranged as a balanced resistance bridge including resistors 355–358 and the contacts 352 and 353 are arranged in a fashion such that an output signal is provided to operate the TO-FROM portion 359 and the LEFT-RIGHT NEEDLE portion 360 of the VOR instrument 343, as the input shaft 345 or the casing 351, or both, is rotated. Power is coupled to and the output signals are taken from the sine-cosine pot 346, by means of a slip ring disc 361 affixed to the casing 351 and having a number of slip rings on it and a corresponding number of contact fingers 362 slidably engaged with the slip rings. A source of AC power is coupled to a transformer 364, and the output of the transformer is rectified and filtered to provide a DC voltage which is coupled to the sine-cosine pot 346, to power the latter. Potentiometers 366 and 367 provide means for adjusting the sensitivity of the VOR 343.

In operation, the course selector knob 347 is rotated to indicate a particular course, in the well-known manner. In doing so, the casing 351 of the sine-cosine pot 346 is rotated with respect to the contacts 352 and 353 so that an appropriate output signal is provided to the TO-FROM portion 359 and the LEFT-RIGHT NEEDLE portion of the VOR 343. For example, if the pilot trainee is simulating a flight towards a particular VOR station, the course selector knob 347 is rotated until the TO-FROM portion 359 indicates a direction "TO" the station and the course he desires to fly is set. The needle of the LEFT-RIGHT NEEDLE portion 360 will be positioned, by the operation of the sine-cosine pot 346, to indicate that the pilot trainee is flying directly toward the station, in which case the needle will be centered, or that he is off course to the right or left of the station, depending upon the position of the recorder 282 on the console 280. As the pilot trainee continues to "fly" toward the station, the recorder 282 continues to move on the console and the needle stays centered. If he changes course or a simulated wind is introduced which effectively "blows" him off course, the recorder 282 will track off of the radial or course to the station. In doing so, the channel 326 is pivotally rotated and this action will cause the input shaft 345 of the sine-cosine pot 346 to be rotated and produce an output signal to deflect the needle to the right or left, depending upon the position of the recorder 282. It can therefore be seen that the operation of a VOR during the course of a flight also is realistically simulated in the trainer 10.

This portion of the trainer 10 can be easily and advantageously used to provide a VOR display device 370, illustrated in FIGS. 19 and 20, for teaching a pilot trainee the principles of the operation of a VOR instrument. The VOR display device 370 includes a display panel 371 which is supported upon a pair of legs 372 which are removably affixed to it and has a large compass rose 373, a TO-FROM indicator 374, a LEFT-RIGHT NEEDLE indicator 375 and a course selector dial 376 affixed to it. A radial arm 377 is fixedly secured to a shaft 378 which is rotatably supported at the center axis of the compass rose 373. A small compass rose dial 379 and model airplane 380 are slidably and rotatably affixed to the radial arm 377, so that both can be slidably positioned along its length and can be rotated with respect to it.

The shaft 378, as seen in FIG. 20, rotatably drives a pulley 382, and the latter is coupled by means of a bead chain drive 383 to a pulley 384 affixed to the input shaft 345 of the sine-cosine pot 346 described above. The course selector dial 376 is affixed to the shaft 348 and functions to rotate the latter to, in turn, rotate the casing 351 of the sine-cosine pot 346. The sine-cosine pot 346 is energized and couples an output signal to the TO-FROM indicator 374 and to the LEFT-RIGHT NEEDLE indicator 375 to operate them in the manner described above.

It can be seen that the radial arm 377 functions in the manner of the channel 326 to provide an azimuth input to the sine-cosine pot 346, however, the radial arm is manually rotated instead of being automatically rotated. In instructing a pilot trainee in the use of a VOR, the course selector dial 376 is set to indicate a particular course, such as, for example, 060°. The radial arm 377 is rotated so that it extends toward 240° on the compass rose 373, as illustrated. The flag of the TO-FROM indicator 374 should indicate "TO," when the radial arm is positioned. If the model airplane 380 is slidably moved along the length of the radial arm 377, the needle of the LEFT-RIGHT NEEDLE indicator 375 should remain centered. Upon passing over the center axis of the compass rose 373, the radial arm 377 is rotated 180° so that it extends toward 060°. The flag of the TO-FROM indicator 374 will now indicate "FROM."

If the model airplane 380 is rotated so that it has a heading of 030°, as indicated on the compass rose dial 379 beneath it, as illustrated, the airplane illustrates that the trainee is flying away from the station, to the left of it, instead of directly toward it. The airplane 380 is slidably moved toward the center of the compass rose 373 and the radial arm 377 simultaneously is slowly rotated in a CW direction to illustrate the path of travel of the airplane with respect to the VOR station. As the radial arm 377 is rotated, a changing azimuth input is coupled to and rotates the input shaft 345 of the sine-cosine pot 346. The sine-cosine pot 346, in turn, causes the needle of the LEFT-RIGHT NEEDLE indicator 375 to move to the right, thereby indicating that the VOR station is to the right of the airplane and the course of the later must be changed to the right to again fly toward the VOR station on the 060° radial. Numerous other problems can be simulated in a like manner, to teach the pilot trainee in the fundamentals of VOR navigation. A needle 381 also is mounted on the channel 326 and always points to the VOR station. The VOR display device 370, therefore, also can be used for fixed card ADF instruction because the needle 381 points to the station. If the compass rose dial 379 is always positioned so that 0° is due North, the VOR display device 370 can be used to teach RMI since the needle 381 points to the station and 0° is due North regardless of the aircraft's heading.

A localizer also can be incorporated into the trainer 10, utilizing the needle portion 359 of the VOR 343. In FIG. 9, a variable resistor 191 having a shaft 192 is fixedly secured along one side of the console 280. A rod 193 is affixed to the shaft 192 and to the recorder 282 so as to rotate the shaft 192 to vary the resistance of the variable resistor 191, as the recorder 282 moves about the console 280. The variable resistor 191 and the rod 193 are disposed and arranged to center the needle of the needle portion 359 of the VOR 343, when and as the recorder 282 tracks along the flight path provided on the console 280. In the illustrated embodiment, the flight path is along the 300° radial, however, any flight path can be provided simply by repositioning the variable resistor 191.

The variable resistor 191, as can be best seen in FIG. 18, is adapted to be connected in series with the needle portion 359 of the VOR 343, by means of the double pole-single throw switch 194. The latter also cuts out of wiper 352 of the sine-cosine pot 346 when the localizer is energized. The switch 194 is mounted on the fuselage 11, so as to be operable by the instructor.

When the localizer is energized, the needle of the needle portion 359 of the VOR 343 remains centered as long as the recorder 282 tracks along the indicated flight path or radial. When the recorder 282 moves to the right or left of the radial, the needle of the needle portion 359 is displaced to the right or left. The action of a localizer therefore is realistically simulated.

The marker light system 68 is adapted to be manually operated by the instructor, as the recorder 282 advances along the radial. Indicator markers 196–198 are provided along the adial, as references for the instructor.

Figure 21:
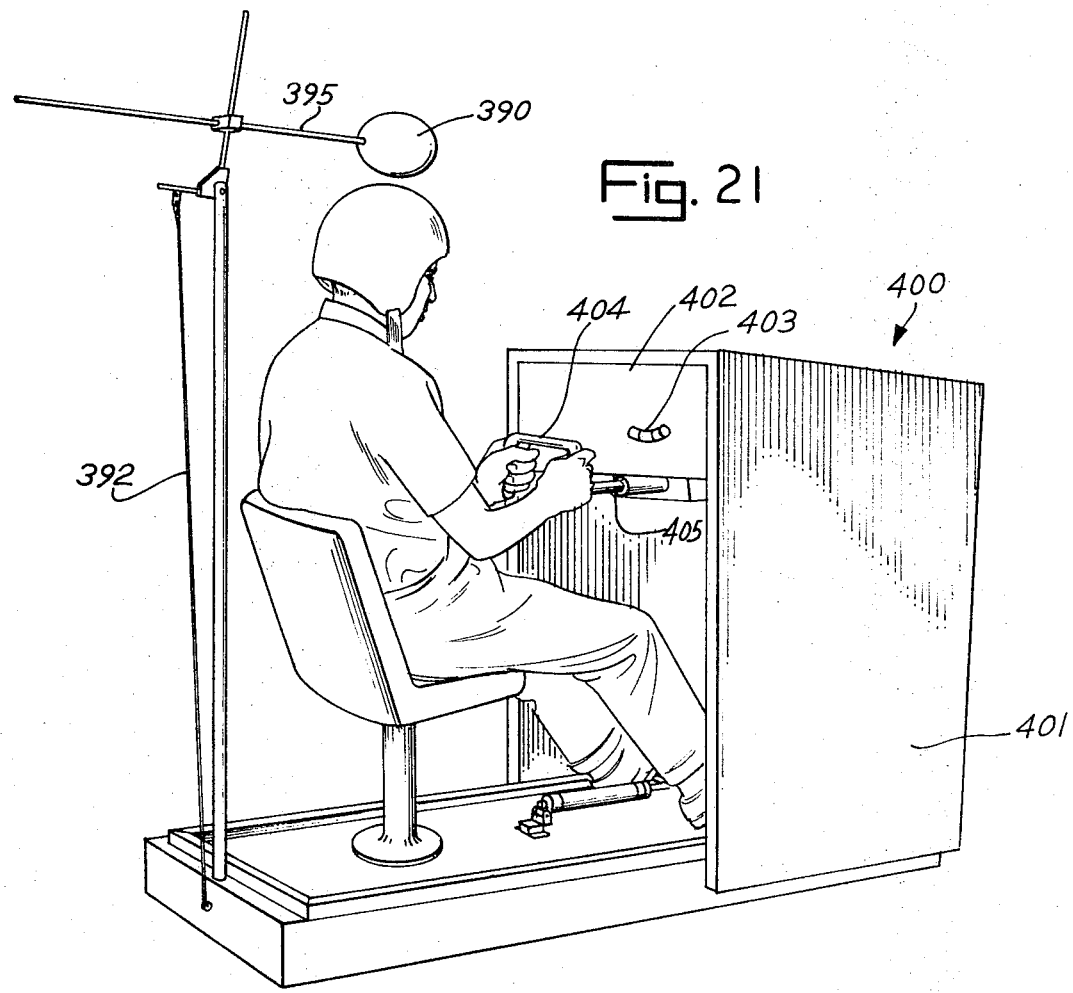
FIG. 21 is a perspective view of a coordination trainer which can be constructed using the principles of the aviation trainer of FIG. 1.
Figure 22:
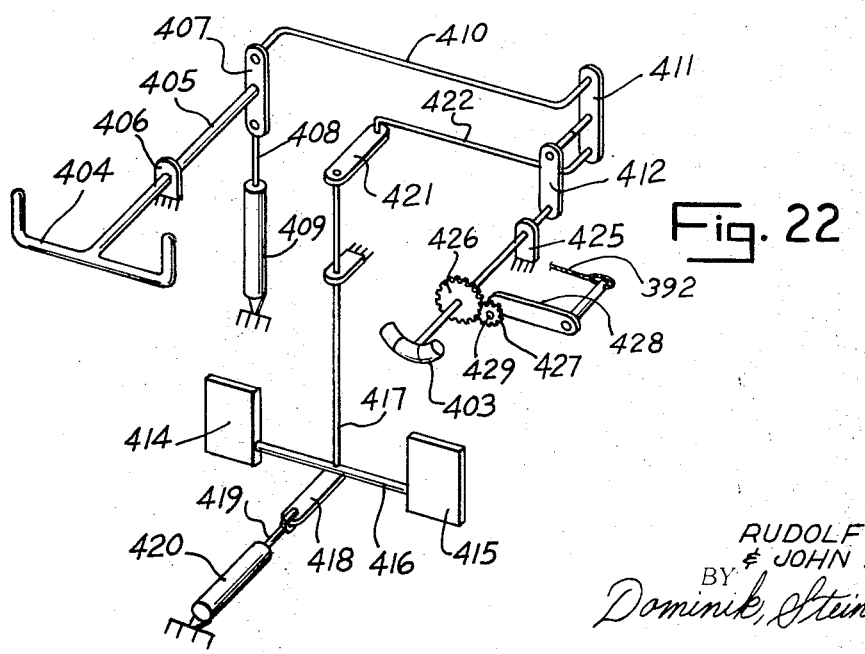
FIG. 22 is a schematic representation of the control levers and linkage arms used with the coordination trainer of FIG. 21.

The trainer 10, as illustrated in FIGS. 21 and 22, also can be provided with a float 390 which is disposed over a pilot trainee's head and is pivotally operable to knock him on the head if he fails to coordinate the use of rudder with ailerons when making a turn, to emphasize the fact that use of rudder is necessary. This is easily accomplished by affixing a lever arm 391 to the input shaft 170 of the adverse yaw system 171, and affixing one end of a flexible cable 392 to it, as illustrated in FIG. 4. This cable 392 then is strung between a pair of pulleys 393 and 394 which are fixedly and rotatably secured together with the peripheral edges thereof disposed to retain the cable between them. When the input shaft 170 is rotated either CW or CCW due to the failure to apply rudder so that a coordinated turn results, the cable 392 is pulled downwardly. The opposite end of the cable 392 is affixed to and pivotally operates the float arm 395 so that the float 390 is caused to knock the pilot trainee on the top of the head.

A relatively simple coordination trainer 400, illustrated in FIGS. 21 and 22, can be constructed to teach a pilot trainee the same thing so that the trainer 10 which is, of course, a relatively expensive item, can be used for more intensive training. The coordination trainer 400 includes a fuselage 401 having an instrument panel 402 upon which there is mounted the ball portion 403 of a turn and bank indicator. A control wheel 404 is affixed to a shaft 405 which is extended through the instrument panel 402 and is rotatably retained and supported within a pillow block 406. The latter restricts linear movement of the shaft 405 and hence the control wheel 404.

A lever arm 407 is affixed to the shaft 405, and one end of the lever arm 407 is pivotally affixed to a piston rod 408 of a hydraulic cylinder 409 which is pivotally secured to the floor of the coordination trainer. The opposite end of the lever arm 407 has one end of a connecting rod 410 affixed to it, and the opposite end of the connecting rod 410 is affixed to a lever arm 411. The lever arm 411 is affixed to a lever arm 412 by means of a coupler 413.

The rudder pedals 414 and 415 are affixed to a bar 416 which is secured to a pivot shaft 417 which is rotatably supported so that the rudder pedals can be pivotally operated. A lever arm 418 is affixed to the bar 416, and to the piston rod 419 of a hydraulic cylinder 420 which is pivotally secured to the floor of the trainer 400.

A lever arm 421 affixed to the upper end of the pivot shaft 417 is coupled by a connecting rod 422 to the lever arm 411.

The lever arm 412 is fixedly secured to the end of a shaft 424 which is fixed by means of a pillow block anchor 425 so that it can only rotate. The opposite end of the shaft 424 is affixed to the ball (not shown) which is movably retained within the ball portions 403 affixed to the instrument panel 402. A gear 426 also is fixedly secured to the shaft 424, and is drivingly meshed with another gear 427 which is fixedly secured to a lever arm 428. The arrangement is such that the lever arm 428 is pivotally operated about the pivot point formed by its pivot securing shaft 429, and releases the cable 392 and permits the float to drop under its own weight and knock the pilot trainee on the top of the head.

The operation of the coordination trainer 400 is an follows. When the control wheel 404 is rotated, to the right or left, the lever arm 407 affixed to its end is likewise rotated. Assuming that the control wheel is moved to the left, the lever arm 407 is rotated CCW which action, in turn, moves the connecting rod 410 to the left. The lever arm 411, if no rudder is applied, or the wrong rudder is applied, will be caused to rotate CCW about the end of the connecting rod 422. In rotating, the coupler 413 is moved to the left which action, in turn, causes the lever arm 412 and the shaft 424 affixed to it to rotate CCW. Rotation of the shaft 424 displaces the ball of the ball portion 403 from its center position, thus indicating that the turn is not coordinated, and further rotates the gear 426. The gear 426, in turn, rotates the gear 427 to cause the lever arm 428 to pivot to release the cable 392. The action operates the float lever arm 395 to knock the float 390 on the head of the pilot trainee.

If left rudder is applied as it should be while making a turn to the left, the pivot shaft 417 and the lever arm 421 affixed to its end are rotated CW. The lever arm 421, in turn, moves the connecting rod 422 to the right. The connecting rod 422 tends to rotate the lever arm 411 in a CCW direction, the same direction in which it is being rotated by the connecting rod 410 when the control wheel 404 is rotated CCW for a left turn, so that the lever arm 411 merely rotates about the coupler 413 and there is no input movement to the lever arm 412. Accordingly, since a properly coordinated turn is being made, the pilot trainee is not knocked in the head by the float 390.

The hydraulic cylinders 409 and 420 return the control wheel 404 and the rudders 414 and 415 to a neutral position, in the manner described above. In addition, the pressure exerted upon the control wheel and the rudders by these hydraulic cylinders simulate the pressure usually experienced in an actual aircraft, in turning or operating the rudder pedals.

The ball disc integrators 40, 51, 139 and 157 can be of the type disclosed in the above-mentioned copending application Ser. No. 476,249.

The trainer 10 also can be, and preferably is, provided with a full panel of instruments, as illustrated in FIG. 2. In addition to those instruments mentioned above, a second VOR 385, a DMF 386, two VOR tuners 387 and 388, an ADF tuner 389, and a communication tuner 396 are provided. With such an arrangement, the VOR 385 is adapted to function as a VOR and as a localizer, in the manner described above. The VOR 343 functions solely as a VOR. The VOR 385 also has a glide slope portion which is controlled by the instructor, by varying a potentiometer (not shown). The DMF 386 likewise is controlled by the instructor, by varying a potentiometer.

The four tuners 387–389 and 396 all are dummy tuners and are used for procedures only.

Pitch and bank switches 397 and 398 are provided and are operable to turn off the pitch and/or bank for teaching various relationships. The other instruments include an engine hour meter 399, a clock 440 and a pair of fuse assemblies 441 and 442.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A stationary aviation trainer for the instruction of pilots comprising a plurality of instruments including an airspeed indicator, an altimeter, a rate of climb indicator and an artificial horizon, a plurality of control means including a control stick, a first mechanical computer coupled to said control stick and to said airspeed indicator, a second mechanical computer coupled to said first mechanical computer and to a mechanical integrator, said second mechanical computer operated in response to the operation of said first mechanical computer to operate said mechanical integrator to provide an output therefrom, said output being coupled to a third mechanical computer which is coupled to and operates said altimeter, said rate of climb indicator and said artificial horizon so as to indicate thereon an assumed simulated altitude, rate of climb or descent and aircraft attitude, respectively, said third mechanical computer also being coupled to and operating said first mechanical computer to operate said airspeed indicator to indicate thereon an assumed simulated airspeed reading, a fourth mechanical computer coupled to and operated by said mechanical integrator, and means coupling said fourth mechanical computer to said first mechanical computer forming a feed back loop to operatively adjust said first mechanical computer to operate said plurality of instruments to cause them to reflect the attitude of the aircraft in accordance with the airspeed for which it is trimmed.

2. The aviation trainer of claim 1 wherein said means coupling said fourth mechanical computer to said first mechanical computer comprises a connecting rod.

3. The aviation trainer of claim 1, further including a throttle coupled to the means coupling said mechanical integrator and said fourth mechanical computer and operable to operate said fourth mechanical computer and said means coupling the latter to said first mechanical computer, said first mechanical computer operating said airspeed indicator to cause it to indicate a corresponding change in airspeed and further operating said third mechanical computer to cause said artificial horizon, said altimeter and said rate of climb indicator to indicate thereon corresponding changes.

4. The aviation trainer of claim 1, further including a directional gyro, a turn and bank indicator, a fifth mechanical computer coupled to said control stick and to another mechanical integrator, said other mechanical integrator being coupled to said artificial horizon and to a sixth mechanical computer which is coupled to and operates said turn and bank indicator and said directional gyro to cause said artificial horizon, said turn and bank indicator and said directional gyro to indicate thereon the assumed attitude of the aircraft in accordance with the movement of said control stick.

5. The aviation trainer of claim 4, further including a seventh mechanical computer coupled to said throttle and both said fifth and sixth mechanical computers, said seventh mechanical computer being operable by said throttle to, in turn, operate said fifth and sixth mechanical computers, said fifth mechanical computer operating said other mechanical integrator to cause the latter to operate said artificial horizon and said sixth mechanical computer to operate said turn and bank indicator and said directional gyro to indicate thereon the assumed attitude of the aircraft in accordance with the movement of said control stick and said throttle.

6. The aviation trainer of claim 5, wherein said other mechanical integrator also is coupled to said second mechanical computer and operates the latter to, in turn, operate said mechanical integrator and said third mechanical computer which is coupled to the output of the latter, said third mechanical computer operating said artificial horizon, said altimeter and said rate of climb indicator to cause them to indicate thereon the assumed attitude of the aircraft in accordance with the movement of said control stick and said throttle.

7. The aviation trainer of claim 6, further including left and right rudder pedals, an adverse yaw system coupled to said rudder pedal and to said seventh mechanical computer, said adverse yaw system being operable by said rudder pedals to operate said seventh mechanical computer to, in turn, operate said fifth and sixth mechanical computers, said fifth mechanical computer operating said other mechanical integrator to cause the latter to operate said artificial horizon and said sixth mechanical computer to operate said turn and bank indicator and said directional gyro to indicate thereon the assumed attitude of the aircraft in accordance with the movement of said rudder pedals.

8. The aviation trainer of claim 7, wherein said control stick is coupled to said adverse yaw system and is adapted to operate it to provide an output to said seventh mechanical computer, said control stick and said rudder pedals further being coupled to said adverse yaw system in a fashion such that no input is coupled to said adverse yaw system when the movement of said control stick and said rudder pedals is coordinated.

9. The aviation trainer of claim 4, further including a fuselage, a model airplane pivotally mounted atop said fuselage, a bank input lever arm included in said coupling between said other mechanical integrator and said sixth mechanical computer and operated by said other mechanical computer, said bank input lever arm being coupled to said model airplane and operable to cause said model airplane to bank in accordance with the operation of said other mechanical computer, said third mechanical computer also being coupled to said model airplane and operable to vary the pitch attitude of said model airplane.

10. The aviation trainer of claim 9, further including a horizon gridboard affixed to said fuselage in a fashion such as to provide a reference horizon associated with said model airplane, whereby said model airplane and said horizon gridboard can be used to instruct a pilot trainee in the fundamentals of contact flying.

11. The aviation trainer of claim 10 further including a projctor/recorder system affixed to said fuselage, said horizon gridboard functioning as a projection screen for said projector/recorder system.

12. The aviation trainer of claim 6, further including ball means which is affixed to a support arm pivotally affixed to said trainer and positioned to knock a pilot trainee on the top of the head with said ball means when pivotally operated, a lever arm affixed to the input to said adverse yaw system, and a flexible cable affixed to said support arm and to said lever arm operable to pivotally operate said support arm when an input is coupled to said adverse yaw system, whereby a pilot trainee is knocked on the top of the head with said ball means if control stick and rudder pedal movements are not coordinated.

13. The aviation trainer of claim 1, further comprising a navigational console including a table top console having a VOR station indicated thereon, a recorder adapted to be driven about the surface of said table top console in accordance with the simulated flight of an aircraft, a VOR indicator including a course selector, a TO-FROM portion and a needle portion, and a control circuit coupled to said TO-FROM portion and said needle portion of said VOR indicator and to said recorder, said control circuit being operated by said recorder to cause said TO-FROM portion and said needle portion of said VOR indicator to indicate the position of said recorder with respect to said VOR station indicated on said table top console, in accordance with the course selected and indicated on said VOR indicator by operating said course selector thereof.

14. The aviation trainer of claim 13, further including an ADF indicator coupled to said control circuit, said control circuit being operated by said recorder to cause said ADF indicator to indicate thereon the position of said recorder with respect to said VOR station indicated on said table top console.

15. The aviation trainer of claim 13 wherein said recorder comprises a frame, a drive wheel housing having a drive wheel for driving said recorder and motor means for driving said drive wheel affixed thereto, said housing being rotatably affixed to said frame and rotatably positioned to track the simulated flight of the aircraft as said recorder is driven about the surface of said table top console by said drive wheel.

16. The aviation trainer of claim 13 wherein said control means comprises a sine-cosine pot including a housing, a balanced resistance bridge, a pair of wiper contacts associated with said balanced resistance bridge in a fashion such as to provide two electrical output signals which are 90° out of phase with one another and an input shaft, said wiper contacts being coupled to the TO-FROM portion and the needle portion of said VOR indicator, respectively, said input shaft and said housing being rotatable with respect to one another and each having one of said balanced resistance bridge and said pair of wipers affixed to them, said course selector of said VOR indicator and said recorder being coupled to said VOR indicator and each being adapted to rotatably displace one of said housing and said input shaft with respect to the other, and a source of power coupled to said balanced resistance bridge for energizing it.

17. The aviation trainer of claim 16 further including a flight path indicated on said table top console representing a localizer radial, a variable resistor having a shaft which is rotatable to vary the resistance of said variable resistor affixed to said navigation console in alignment with said flight path, an arm affixed to said shaft and to said recorder so as to be pivotally operated as said recorder moves about said table top console to rotate said shaft, switch means operable to disconnect said needle portion of said VOR indicator from said wiper and to connect said variable resistor and said needle portion in a series circuit with said source of power, said variable resistor being operated by said arm to cause said needle portion of said VOR indicator to indicate the position of said recorder with respect to said flight path indicated on said table top console.

18. The aviation trainer of claim 17 further icnluding marker boundary indications along said flight path indicated on said table top console, marker lights in said trainer and operable to indicate the position of said recorder with respect to respective ones of said marker boundary indications.

19. An aviation trainer comprising a fuselage, indicator means for providing a coordinated flight indication, striker means affixed to a support arm which is pivotally affixed to said trainer in a position such that said striker means strikes a pilot trainee seated in said trainer when said support arm is pivotally operated, a mechanical computer coupled to said support arm and to said indicator means, a control stick and a pair of rudder pedals coupled to said mechanical computer and adapted to operate said mechanical computer to cause said indicator means to indicate the assumed coordinated flight condition of said trainer and to pivotally operate said support arm to cause said striker means to strike said pilot trainee when the operation of said control stick and said pair of rudder pedals are not properly coordinated.

20. The aviation trainer of claim 19 wherein said indicator means comprises a transparent arcuate-shaped tubular member having a ball movably disposed therein, said ball normally being centrally disposed within said tubular member and coupled to and movably displaced by said mechanical computer when the operation of said control stick and said pair of rudder pedals is not properly coordinated.

21. The aviation trainer of claim 20 wherein said mechanical computer is coupled to said support arm by means of a flexible cable.

22. The aviation trainer of claim 21 further including means coupled to said control stick and to said pair of rudder pedals for resisting the operation thereof so as to simulate the effect of the airstream over the ailerons and the rudder of an aircraft and to center said control stick and said rudder pedals.

References Cited

UNITED STATES PATENTS

| | | | |
|---|---|---|---|
| 2,409,238 | 10/1946 | Barber | 35—12 |
| 2,485,292 | 10/1949 | Kail | 35—12 |
| 3,378,938 | 4/1968 | Frasca | 35—12 |

EUGENE R. CAPOZIO, Primary Examiner

P. V. WILLIAMS, Assistant Examiner

U.S. Cl. X.R.

35—10.2